（12）United States Patent
Kondo

(10) Patent No.: US 10,861,420 B2
(45) Date of Patent: Dec. 8, 2020

(54) IMAGE OUTPUT APPARATUS, IMAGE OUTPUT METHOD, FOR SIMULTANEOUS OUTPUT OF MULTIPLE IMAGES

(71) Applicant: I-CUBED RESEARCH CENTER INC., Tokyo (JP)

(72) Inventor: Tetsujiro Kondo, Tokyo (JP)

(73) Assignee: I-CUBED RESEARCH CENTER INC., Tokyo (JP)

( * ) Notice: Subject to any disclaimer, the term of this patent is extended or adjusted under 35 U.S.C. 154(b) by 0 days.

(21) Appl. No.: 16/313,549

(22) PCT Filed: Jun. 29, 2017

(86) PCT No.: PCT/JP2017/024010
§ 371 (c)(1),
(2) Date: Dec. 27, 2018

(87) PCT Pub. No.: WO2018/003939
PCT Pub. Date: Jan. 4, 2018

(65) Prior Publication Data
US 2019/0228744 A1    Jul. 25, 2019

(30) Foreign Application Priority Data

Jun. 30, 2016  (JP) ................... 2016-129689
Jul. 26, 2016   (JP) ................... 2016-146339
Dec. 7, 2016    (JP) ................... 2016-237182

(51) Int. Cl.
*G09G 5/36* (2006.01)
*H04N 5/14* (2006.01)
(Continued)

(52) U.S. Cl.
CPC ............. *G09G 5/363* (2013.01); *G09G 5/00* (2013.01); *G09G 5/36* (2013.01); *H04N 5/14* (2013.01);
(Continued)

(58) Field of Classification Search
CPC .................................. G09G 5/363; H04N 5/14
See application file for complete search history.

(56) References Cited

U.S. PATENT DOCUMENTS 7,791,652 B2 * 9/2010 Mitsunaga ........... H04N 1/4092
348/222.1
2006/0268299 A1  11/2006 Nose et al.
(Continued)

FOREIGN PATENT DOCUMENTS

CN       1920942 A    2/2007
CN    101116109 A    1/2008
(Continued)

OTHER PUBLICATIONS

International Search Report issued in Application No. PCT/JP2017/024010 dated Oct. 3, 2017, with English translation.
(Continued)

*Primary Examiner* — Terrell M Robinson
(74) *Attorney, Agent, or Firm* — McDermott Will & Emery LLP

(57) ABSTRACT

In order to solve a conventional problem that it is not possible to simultaneously output two or more images obtained by performing different processes on one input image, an image output apparatus includes: an input image accepting unit that accepts an input image; a first image acquiring unit that acquires a first image based on the input image; a second image acquiring unit that performs an image process that is different from the process that is performed by the first image acquiring unit, on the input image or the first image, thereby acquiring a second image; and an output unit that outputs the first image and the second image. Accordingly, it is possible to simultaneously output two or more images obtained by performing different processes on one input image.

19 Claims, 32 Drawing Sheets

(51) Int. Cl.
   *H04N 21/431* (2011.01)
   *H04N 21/442* (2011.01)
   *G09G 5/00* (2006.01)

(52) U.S. Cl.
   CPC ......... *H04N 21/431* (2013.01); *H04N 21/442* (2013.01)

(56) References Cited

U.S. PATENT DOCUMENTS

| | | | | |
|---|---|---|---|---|
| 2008/0107360 | A1* | 5/2008 | Yamashita | G06T 5/004 382/313 |
| 2010/0129001 | A1* | 5/2010 | Tsukada | H04N 1/46 382/254 |
| 2010/0182446 | A1* | 7/2010 | Matsubayashi | H04N 5/23229 348/222.1 |
| 2010/0253849 | A1* | 10/2010 | Kegasawa | G06T 1/20 348/584 |
| 2013/0162908 | A1* | 6/2013 | Son | H04N 5/14 348/571 |
| 2014/0176799 | A1* | 6/2014 | Kondo | H04N 17/004 348/575 |
| 2015/0062434 | A1 | 3/2015 | Deng et al. | |
| 2015/0256860 | A1* | 9/2015 | Kunkel | G09G 5/10 348/598 |
| 2015/0325178 | A1* | 11/2015 | Nagashima | G09G 3/34 345/590 |
| 2020/0074710 | A1* | 3/2020 | Kunkel | H04N 21/4318 |

FOREIGN PATENT DOCUMENTS

| | | | |
|---|---|---|---|
| CN | 104408699 | A | 3/2015 |
| CN | 105142513 | A | 12/2015 |
| EP | 1635295 | A1 | 3/2006 |
| EP | 2151803 | A1 | 2/2010 |
| EP | 2744209 | A1 | 6/2014 |
| EP | 2958073 | A1 | 12/2015 |
| JP | 2005-086355 | A | 3/2005 |
| JP | 2005086355 | A * | 3/2005 |
| JP | 2006-013618 | A | 1/2006 |
| JP | 2006013618 | A * | 1/2006 |
| JP | 2007-004136 | A | 1/2007 |
| JP | 2007-325062 | A | 12/2007 |
| JP | 2007325062 | A * | 12/2007 |
| JP | 2010-026021 | A | 2/2010 |
| JP | 2010026021 | A * | 2/2010 |
| JP | 2014-150308 | A | 8/2014 |
| JP | 2015-158928 | A | 9/2015 |
| WO | 2014/167616 | A1 | 10/2014 |
| WO | WO-2014167616 | A1 * | 10/2014 ............... G09G 5/10 |

OTHER PUBLICATIONS

Extended European Search Report issued in corresponding European Patent Application No. EP17820293, dated Dec. 12, 2019.

First Office Action issued in corresponding Chinese Application No. 201780038386.7, dated Jul. 21, 2020, with English language translation.

* cited by examiner

|  | Display apparatus 1 (First image) | Display apparatus 2 (Second image) |
|---|---|---|
| Generic process | ○ | ○ |
| Individual process 1 | ○ | ○ |
| Individual process 2 | × | ○ |
| Individual process 3 | × | ○ |

FIG.13

|  | Generic process | Individual process 1 | Individual process 2 | Individual process 3 | Positional information | Size |
|---|---|---|---|---|---|---|
| First image | ○ | ○ |  |  | (0,0) | Full screen |
| Second image (1) | ○ |  | ○ |  | $(x_1, y_1)$ | $a_1 \times b_1$ |
| Second image (2) | ○ |  |  | ○ | $(x_2, y_2)$ | $a_2 \times b_2$ |

FIG.15

IMAGE OUTPUT APPARATUS, IMAGE OUTPUT METHOD, FOR SIMULTANEOUS OUTPUT OF MULTIPLE IMAGES

RELATED APPLICATIONS

This application is the U.S. National Phase under 35 U.S.C. § 371 of International Application No. PCT/JP2017/024010, Filed Jun. 29, 2017, which in turn claims the benefit of Japanese Application No. 2016-129689, filed on Jun. 30, 2016, Japanese Application No. 2016-146339, filed on Jul. 26, 2016, and Japanese Application No. 2016-237182, filed on Dec. 7, 2016, the disclosures of which are incorporated by reference herein.

BACKGROUND OF THE INVENTION

1. Field of the Invention

The present invention relates to an image output apparatus for accepting one input image and outputting two or more images, and the like.

2. Description of Related Art

As a first conventional technique, there is an image providing device that provides an image to a display apparatus capable of displaying images in PinP, including a position acquiring part that acquires a position of a PinP display image that is displayed on the display apparatus so as to be superimposed on the image provided by the image providing device, wherein the display apparatus is provided with an image in which either a side that a cursor contained in the image provided by the image providing device moves across when entering the region of the PinP display image or a side that the cursor moves across when exiting the region of the PinP display image is emphasized (see JP 2015-158928A, for example).

As a second conventional technique, there is a video signal processing apparatus capable of avoiding a problem that the same pixel data stored in memories is simultaneously read by multiple processes, without enlarging the sizes of the memories in which video signals are stored (see JP 2014-150308A, for example).

However, according to the first conventional technique, it is not possible to simultaneously output two or more images obtained by performing different processes on one input image. One of the two or more images obtained by performing different processes may contain an image on which no process has been performed.

Thus, according to the first conventional technique, it is not possible for a user to composite and enjoy video beyond the expressiveness of a display screen in his or her mind.

Furthermore, the second conventional technique is problematic in that, when intending to customize various image processes according to user's preference, the hardware scale of the video signal processing apparatus increases. That is to say, conventionally, there is a problem in that, when intending to customize various image processes according to user's preference, if hardware that performs processing for each customization is prepared, the hardware of the video signal processing apparatus increases.

SUMMARY OF THE INVENTION

A first aspect of the present invention is directed to an image output apparatus including: an input image accepting unit that accepts an input image; a first image acquiring unit that acquires a first image based on the input image; a second image acquiring unit that performs an image process that is different from the process that is performed by the first image acquiring unit, on the input image or the first image, thereby acquiring a second image; and an output unit that outputs the first image and the second image.

With this configuration, it is possible to simultaneously output two images obtained by performing different processes on one input image, and it is possible for a user to composite and enjoy video beyond the expressiveness of a display screen in his or her mind.

Furthermore, a second aspect of the present invention is directed to the image output apparatus according to the first aspect, wherein the first image acquiring unit performs a first image process on the input image, thereby acquiring a first image, and the second image acquiring unit performs a second image process that is different from the first image process, on the input image or the first image, thereby acquiring a second image.

With this configuration, it is possible to simultaneously output two images obtained by performing different processes on one input image, and it is possible for a user to composite and enjoy video beyond the expressiveness of a display screen in his or her mind.

Furthermore, a third aspect of the present invention is directed to the image output apparatus according to the first or second aspect, wherein the first image acquiring unit performs a generic process, which is an essential process, on the input image, thereby acquiring a first image, and the second image acquiring unit performs a second individual process, which is an optional process, on the first image, thereby acquiring a second image.

With this configuration, it is possible to simultaneously output two images obtained by performing different processes on one input image, and it is possible for a user to composite and enjoy video beyond the expressiveness of a display screen in his or her mind.

Furthermore, a fourth aspect of the present invention is directed to the image output apparatus according to the third aspect, wherein the first image acquiring unit performs a generic process, which is an essential process, on the input image, and performs a first individual process, which is an optional process, on a result of the generic process, thereby acquiring a first image.

With this configuration, it is possible to simultaneously output two images obtained by performing different processes on one input image, and it is possible for a user to composite and enjoy video beyond the expressiveness of a display screen in his or her mind.

Furthermore, a fifth aspect of the present invention is directed to the image output apparatus according to the third or fourth aspect, wherein, in a case in which a user instruction that is an instruction as to whether or not to perform an individual process, which is an optional process, is accepted, the second image acquiring unit performs the second individual process, the first image acquiring unit performs the first individual process, or the second image acquiring unit performs the second individual process and the first image acquiring unit performs the first individual process.

With this configuration, it is possible to simultaneously output two images obtained by performing different processes on one input image, according to an instruction from a user, and it is possible for a user to composite and enjoy video beyond the expressiveness of a display screen in his or her mind.

Furthermore, a sixth aspect of the present invention is directed to the image output apparatus according to the first or second aspect, wherein the first image acquiring unit acquires a first image without performing any image process on the input image, and the second image acquiring unit performs a second image process on the input image or the first image, thereby acquiring a second image.

With this configuration, it is possible to simultaneously output two images obtained by performing different processes on one input image, and it is possible for a user to composite and enjoy video beyond the expressiveness of a display screen in his or her mind.

Furthermore, a seventh aspect of the present invention is directed to the image output apparatus according to any one of the first to sixth aspects, including two or more second image acquiring units that respectively perform different image processes on the input image or the first image, wherein the output unit outputs two or more second images respectively acquired by the two or more second image acquiring units, and the first image.

With this configuration, it is possible to simultaneously output three or more images obtained by performing different processes on one input image, and it is possible for a user to composite and enjoy video beyond the expressiveness of a display screen in his or her mind.

Furthermore, an eighth aspect of the present invention is directed to the image output apparatus according to any one of the first to seventh aspects including a storage unit in which correspondence information indicating correspondence between optical signal information related to an optical signal in an environment in which an image is acquired and electrical signal information related to an electrical signal in the environment is stored, wherein the first image acquiring unit or the second image acquiring unit acquires one or more pieces of optical signal information corresponding to one or more pieces of electrical signal information that are acquired from the input image, using the correspondence information, and acquires the first image or the second image from the input image using the optical signal information.

With this configuration, it is possible to simultaneously output two or more images obtained by performing different proper processes on one input image, and it is possible for a user to composite and enjoy video beyond the expressiveness of a display screen in his or her mind.

Furthermore, a ninth aspect of the present invention is directed to the image output apparatus according to any one of the first to eighth aspects, including a system feature accepting unit that accepts one or at least two system features from when an image is acquired to when an image is output, wherein the first image acquiring unit or the second image acquiring unit acquires the first image or the second image from the input image using the one or more system features.

With this configuration, it is possible to simultaneously output two or more images obtained by performing different proper processes on one input image, and it is possible for a user to composite and enjoy video beyond the expressiveness of a display screen in his or her mind.

Furthermore, a tenth aspect of the present invention is directed to the image output apparatus according to any one of the first to ninth aspects, wherein the output unit outputs the first image and the second image to a same display screen.

With this configuration, it is possible to output two or more images obtained by performing different processes on one input image, to a same display screen, and it is possible for a user to composite and enjoy video beyond the expressiveness of the display screen in his or her mind.

Furthermore, an eleventh aspect of the present invention is directed to the image output apparatus according to the tenth aspect, wherein the output unit outputs the first image and the second image to a same display screen in PinP.

With this configuration, it is possible to output two or more images obtained by performing different processes on one input image, on a same display screen in PinP, and it is possible for a user to composite and enjoy video beyond the expressiveness of the display screen in his or her mind.

Furthermore, a twelfth aspect of the present invention is directed to the image output apparatus according to any one of the first to eleventh aspects, wherein the second image is an image of a partial spatial region of the first image.

With this configuration, it is possible to simultaneously output a first image and a second image, which is an image of a partial spatial region of the first image, and it is possible for a user to composite and enjoy video beyond the expressiveness of a display screen in his or her mind.

Furthermore, a thirteenth aspect of the present invention is directed to the image output apparatus according to any one of the first to twelfth aspects, wherein, in a case in which a user instruction that specifies a partial spatial region of the input image or the first image is accepted, the second image acquiring unit performs an image process that is different from the process that is performed by the first image acquiring unit, on an image of the spatial region specified by the user instruction, thereby acquiring a second image.

With this configuration, it is possible to simultaneously output a first image, and a second image of a partial spatial region instructed by a user.

Furthermore, a fourteenth aspect of the present invention is directed to the image output apparatus according to any one of the first to thirteenth aspects, wherein the second image includes images of two or more spatial regions, each of which is part of the input image or the first image, the second image acquiring unit acquires second images of the two or more spatial regions, and the output unit outputs the first image and the two or more second images.

With this configuration, it is possible to simultaneously output a first image, and two or more second images of two or more partial spatial regions instructed by a user.

Furthermore, a fifteenth aspect of the present invention is directed to the image output apparatus according to any one of the first to fourteenth aspects, further including: an image storage unit in which an image is stored; and a storing processing unit that stores the whole or part of the input image, the first image, or the second image, in the image storage unit, wherein the second image acquiring unit performs an image process that is different from the process that is performed by the first image acquiring unit, on the image stored in the image storage unit, thereby acquiring a second image, and the output unit simultaneously outputs the first image, and a second image acquired based on an input image corresponding to a time different from the first image.

With this configuration, it is possible to simultaneously output a first image, and a second image at a partial spatial region instructed by a user and at a different time from the first image.

Furthermore, a sixteenth aspect of the present invention is directed to the image output apparatus according to any one of the first to fifteenth aspects, wherein a position or a size of a display region of the second image is allowed to dynamically change.

With this configuration, a position or a size of a display region of the second image is allowed to dynamically change, so that it is possible for a user to more easily view the first image or the second image.

Furthermore, a seventeenth aspect of the present invention is directed to the image output apparatus according to any one of the first to sixteenth aspects, wherein the second image acquiring unit acquires one or more feature values of an image of a region containing a partial spatial region of the input image, the first image, or the second image, and performs different processes according to the one or more feature values.

With this configuration, it is possible to properly and simultaneously output a first image, and a second image of a partial spatial region instructed by a user.

Furthermore, an eighteenth aspect of the present invention is directed to the image output apparatus according to any one of the first to sixteenth aspects, wherein, in a case in which a user instruction that selects one or more individual processes from among two or more individual processes is accepted, the second image acquiring unit performs the selected one or more individual processes on an image of a partial spatial region of the input image or the first image, thereby acquiring a second image.

With this configuration, it is possible to simultaneously output a first image, and a second image of a partial spatial region instructed by a user, the second image being desired by a user.

Furthermore, a nineteenth aspect of the present invention is directed to the image output apparatus according to any one of the first to eighteenth aspects, wherein the second image acquiring unit extracts an image of a partial spatial region from the first image, thereby acquiring a second image.

With this configuration, it is possible to simultaneously output a first image, and a second image of a partial spatial region instructed by a user, the second image being a partial spatial region of the first image.

Furthermore, a twentieth aspect of the present invention is directed to the image output apparatus according to any one of the first to nineteenth aspects, further including a parameter storage unit in which one or more parameters that are used for a process that is performed by the first image acquiring unit or the second image acquiring unit are stored; and a parameter storing unit that, in a case in which one or more parameters are accepted, stores the one or more parameters in the parameter storage unit, wherein the first image acquiring unit or the second image acquiring unit acquires a first image or a second image, using the one or more parameters in the parameter storage unit.

With this configuration, it is possible to store a parameter based on an instruction from a user, and to simultaneously output a second image and a first image acquired using the parameter.

Furthermore, a twenty-first aspect of the present invention is directed to a video signal processing apparatus, including: an input image accepting unit that accepts an input image; an instruction accepting unit that accepts a user instruction as to whether or not to perform an individual process, which is an optional process; a generic processing unit that performs a generic process, which is an essential process, on the input image, thereby acquiring first processing information; an individual processing unit that, in a case in which the user instruction is an individual process instruction, which is an instruction to perform an individual process, performs an individual process on the input image, thereby acquiring second processing information; a constructing unit that, in a case in which the instruction accepting unit accepts an individual process instruction, constructs an output image using the first processing information and the second processing information; and an output unit that outputs the output image constructed by the constructing unit in a case in which the instruction accepting unit accepts an individual process instruction, and outputs the output image acquired using the first processing information in a case in which the instruction accepting unit does not accept an individual process instruction.

With this configuration, it is possible to output an image desired by a user while reducing the hardware scale.

Furthermore, a twenty-second aspect of the present invention is directed to the video signal processing apparatus according to the twenty-first aspect, including two or more individual processing units, wherein the instruction accepting unit accepts a user instruction as to whether or not to perform an individual process corresponding to each of the two or more individual processing units, in a case in which the instruction accepting unit accepts an individual process instruction, the constructing unit constructs an output image using one or more pieces of second processing information acquired by individual processing units corresponding to the individual process instruction, and the first processing information, and the output unit outputs the output image constructed by the constructing unit in a case in which the instruction accepting unit accepts an individual process instruction, and outputs the output image acquired using the first processing information in a case in which the instruction accepting unit does not accept an individual process instruction.

With this configuration, it is possible to output an image desired by a user while reducing the hardware scale.

Furthermore, a twenty-third aspect of the present invention is directed to the video signal processing apparatus according to the twenty-second aspect, wherein the instruction accepting unit accepts at least one individual process instruction, the constructing unit constructs an output image using at least one piece of second processing information and the first processing information, and the output unit outputs the output image constructed by the constructing unit.

With this configuration, it is possible to output an image desired by a user while reducing the hardware scale.

Furthermore, a twenty-fourth aspect of the present invention is directed to the video signal processing apparatus according to the twenty-first aspect, wherein the individual processing unit includes two or more individual processing parts that perform an individual process, and acquires second processing information using one or more individual processing parts among the two or more individual processing parts, the instruction accepting unit accepts a user instruction as to whether or not to perform an individual process corresponding to each of the two or more individual processing parts, and, in a case in which the instruction accepting unit accepts an individual process instruction, the constructing unit constructs an output image, using second processing information acquired using the one or more individual processing parts corresponding to the individual process instruction, and the first processing information.

With this configuration, it is possible to output an image desired by a user while reducing the hardware scale.

Furthermore, a twenty-fifth aspect of the present invention is directed to the video signal processing apparatus according to the twenty-fourth aspect, wherein the instruction accepting unit accepts at least one individual process instruction, and the output unit outputs the output image constructed by the constructing unit.

With this configuration, it is possible to output an image desired by a user while reducing the hardware scale.

According to the image output apparatus of the present invention, it is possible to simultaneously output two or more images obtained by performing different processes on one input image, and it is possible for a user to composite and enjoy video beyond the expressiveness of a display screen in his or her mind.

BRIEF DESCRIPTION OF THE DRAWINGS

FIG. 13 shows an image process management table in the embodiment.

FIG. 15 shows an image process management table in the embodiment.

DETAILED DESCRIPTION OF THE INVENTION

Figure 1:
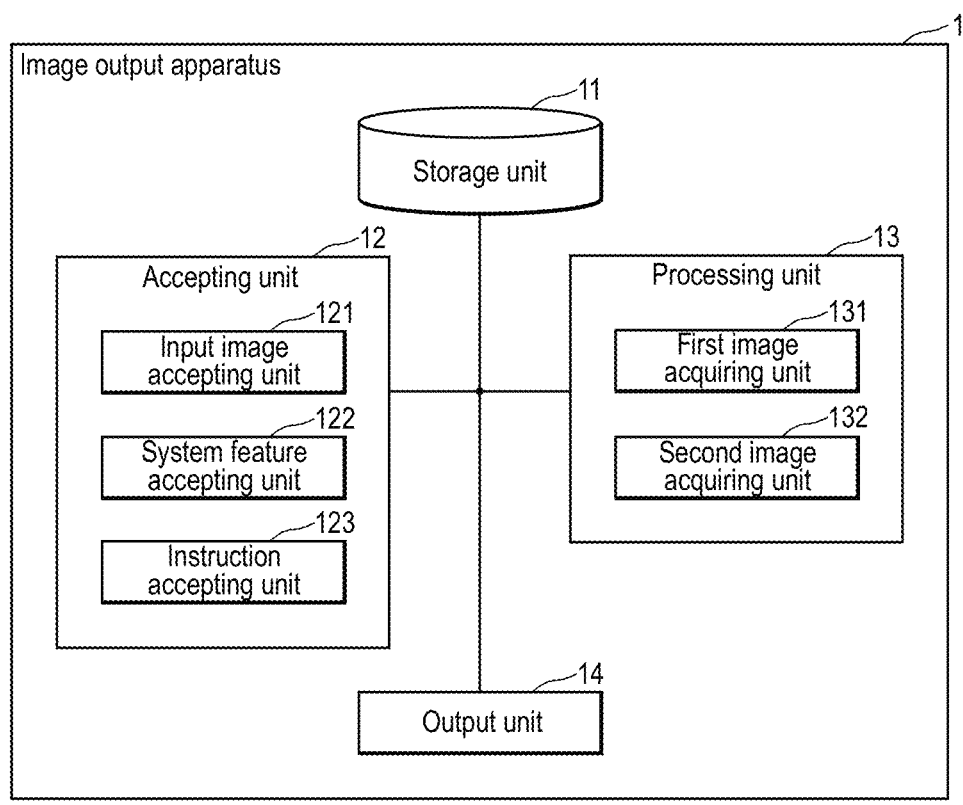
FIG. 1 is a block diagram of an image output apparatus 1 in Embodiment 1.

Hereinafter, embodiments of an image output apparatus and the like will be described with reference to the drawings. It should be noted that constituent elements denoted by the same reference numerals in the embodiments perform similar operations, and thus a description thereof may not be repeated.

Embodiment 1

In this embodiment, an image output apparatus that outputs two or more images (e.g., a first image and a second image) obtained by performing different processes on one input image will be described.

Furthermore, in this embodiment, a case will be described in which a first image is acquired through a first image process that is a generic process, and a second image is acquired through a second image process including an individual process in addition to the generic process. The generic process and the individual process will be described later.

Furthermore, in this embodiment, a case will be described in which a first image is acquired through a first image process including a first individual process in addition to the generic process, and a second image is acquired through a second image process including a second individual process in addition to the generic process.

Furthermore, in this embodiment, a case will be described in which a first image is acquired without performing any process on one input image, and a second image is acquired by performing a second image process on the one input image.

Furthermore, in this embodiment, a case will be described in which an individual process is changed according to a user instruction.

Furthermore, in this embodiment, a case will be described in which an image signal process that converts an input image signal into an output image signal in consideration of behavior of light in nature is performed as a first image process or a second image process.

Furthermore, in this embodiment, a case will be described in which a process is performed that acquires an output image by performing a conversion process on an input image using one or more system features from when an image is captured to when the image is received by a receiver, as a first image process or a second image process. The system features will be described later.

Furthermore, in this embodiment, a case will be described in which a first image and one or more second images are output to one display screen.

Furthermore, in this embodiment, a case will be described in which a first image and one or more second images are displayed in PinP.

Furthermore, in this embodiment, a case will be described in which a second image is an image of a partial spatial region of the first image.

FIG. 1 is a block diagram of an image output apparatus 1 in this embodiment. The image output apparatus 1 is, for example, a video output apparatus such as a television receiver, a Blu-ray (registered trademark) recorder, or a DVD (registered trademark) recorder, a camera, a photo output apparatus, or the like, and there is no limitation on the apparatus as long as it can process images. Each image is typically a moving image (which may be referred to as video), but also may be a still image. Other information such as voice may be associated with an image. Other information may be contained in an image. It will be appreciated that there is no limitation on the data form, format, and the like of an image.

The image output apparatus 1 includes a storage unit 11, an accepting unit 12, a processing unit 13, and an output unit 14.

The accepting unit 12 includes an input image accepting unit 121, a system feature accepting unit 122, and an instruction accepting unit 123.

The processing unit 13 includes a first image acquiring unit 131 and a second image acquiring unit 132.

In the storage unit 11, various types of information can be stored. The various types of information are, for example, correspondence information. The various types of information are, for example, an optical signal database having one or at least two pieces of optical signal information, or an electrical signal database having one or at least two pieces of electrical signal information. The various types of information are, for example, a program for performing any process associated with a later-described process identifier.

Furthermore, the correspondence information is information indicating correspondence between optical signal information and electrical signal information. The correspondence information is information that is used to convert an image while applying constraints such that light emitted from an output image (e.g., a later-described first image and second image) does not behave in a very unnatural manner as light in nature. The correspondence information is, for example, information for acquiring a proper amount of change in an electrical signal in accordance with the amount of change in light. The correspondence information indicating correspondence between optical signal information and electrical signal information may be electrical signal information.

The optical signal information is information related to an optical signal in an environment in which an image is acquired (typically, an environment in nature). The optical signal information is, for example, information indicating a feature of an optical signal (which may be referred to as an optical signal feature). The optical signal information is, for example, information indicating that the resolution is infinite, information indicating that there is no upper limit or lower limit of a signal range, which is an amplitude of signal intensity, or the like. The optical signal information is typically information obtained by measuring light in nature. The optical signal information is, for example, intensity itself (a lux value, etc.) of light. The optical signal information is, for example, light amount change information indicating a change in the amount of light in a unit time. The optical signal information is, for example, diffusion level change information indicating a change in a diffusion level of a light source in a unit time or a predetermined period of time. The diffusion level information is, for example, a diffusion angle. The optical signal information is, for example, light source positional change information indicating a continuous change in a position of a light source in a unit time or a predetermined period of time. The light source positional change information is, for example, a coordinate position of a start point, a coordinate position of an end point, and a moving speed. The optical signal information is, for example, information indicating whether light that is shining on an object in an image is direct light or diffused light. The optical signal information is, for example, information indicating whether light that is reflected by an object in part of an image (e.g., one block in an image) is mirror-reflected or diffuse-reflected.

Furthermore, the electrical signal information is information related to an electrical signal. The electrical signal information is, for example, information indicating a feature of an electrical signal (which may be referred to as an electrical signal feature). The electrical signal information is, for example, information indicating that quantization was performed at a particular number of bits (e.g., 10 bits), or information indicating a signal range (e.g., 64 to 940). The electrical signal information is, for example, a proper amount of change in an electrical signal. The electrical signal information is, for example, intensity itself (a pixel value) of an electrical signal. The electrical signal information is, for example, a later-described process identifier. The electrical signal information is, for example, image change specifying information for specifying a change in an image. The image change specifying information is, for example, information indicating the amount of change in a pixel value, or information indicating the amount of change in luminance.

If the optical signal information is light amount change information, and the electrical signal information is image change specifying information, the correspondence information is information for specifying a change in an image when the amount of light is changed. If the optical signal information is diffusion level change information, and the electrical signal information is image change specifying information, the correspondence information is information for specifying a change in an image when the diffusion level of a light source is changed. If the optical signal information is light source positional change information, and the electrical signal information is image change specifying information, the correspondence information is information for specifying a change in an image when the position of a light source is changed. The change in the position of a light source is, for example, a change "from a position directly above a subject to a position just therebeside", "from a position in front of a subject to a position therebehind", or the like.

Furthermore, the correspondence information may be, for example, a look-up table (hereinafter, also referred to as an "LUT" as appropriate) having two or more correspondence records each indicating correspondence between optical signal information and electrical signal information.

The LUT is, for example, information indicating a behavioral corresponding relationship between an optical signal and an electrical signal. For example, the information indicating a corresponding relationship is, for example, a signal range of a quantized electrical signal and a signal range of an optical signal with an infinite gradation, corresponding to the signal range of the electrical signal. The information indicating a corresponding relationship is, for example, an acceptable range of a change in an optical signal when an electrical signal is changed. That is to say, the LUT or the correspondence information may be only optical signal information.

Furthermore, the LUT has one or at least two correspondence records. Each correspondence record is information for identifying correspondence between the whole or part of one or at least two input images and the whole or part of one or at least two output images. If the number of correspondence records contained in the LUT is one, the correspondence record is, for example, an operation expression for converting an image, or one or more parameter groups that are to be given to an operation expression for converting an image. Examples of the parameter constituting a parameter group include a coefficient of a multiply-accumulate operation, a level for changing a difference or a ratio between brightness and darkness, a determination parameter, and the like. The determination parameter is a threshold that is used for determination, and examples thereof include a threshold for a pixel value or the like for determining whether light is mirror-reflected or diffuse-reflected, a threshold for a pixel value or the like for determining whether light is direct light or diffused light, and the like.

Furthermore, the correspondence information may have optical signal information or electrical signal information that is an operation expression corresponding to an input image and related to a tap arranged in spacetime. The operation expression is, for example, an equation for multiplying each of multiple taps on input image information by a predetermined coefficient and accumulating the products. The operation expression is, for example, an equation for multiplying each of multiple taps on input image information by a coefficient obtained from optical signal information and accumulating the products. The tap refers to pixel values of a pixel of interest and pixels in the vicinity thereof in an input image. That is to say, the operation expression related to a tap arranged in spacetime is an operation expression of the multiply-accumulate operation for multiplying each of pixel values of a pixel of interest and pixels in the vicinity thereof in an input image by a predetermined coefficient, and computing the sum of all results obtained through the multiplication. The pixel of interest and the pixels in the vicinity thereof in an input image are two or more pixels, and there is no limitation on the number of the pixels.

The correspondence information may be an LUT having two or more correspondence records each indicating correspondence between optical signal information and a process identifier for identifying a process. The process identifier is information corresponding to a program for realizing a process, and examples thereof include a program name, an executable module name, a program ID, and the like.

Furthermore, as described above, the LUT typically has one or at least two correspondence records. Each correspondence record is information for identifying correspondence between one or at least two input images and one or at least two output images. In the storage unit 11, two or more LUTs may be stored in association with one or at least two system features. The information for identifying correspondence between input images and output images is information for identifying correspondence between the whole or part of input images and the whole or part of output images. If the number of correspondence records contained in an LUT is one, the correspondence record is, for example, an operation expression for converting an image, or one or more parameter groups that are to be given to an operation expression for converting an image. The correspondence record may be, for example, an operation expression for calculating the median of pixel values of a spatio-temporal block.

Furthermore, the various types of information are one or at least two image conversion operation expressions, or one or at least two pieces of change information. The image conversion operation expression is an operation expression for performing image conversion.

The change information is, for example, information for changing a parameter of an image conversion operation expression. In the storage unit 11, one or more pieces of change information may be stored in association with one or at least two system features. In the storage unit 11, one or more image conversion operation expressions may be stored in association with one or at least two system features.

The change information may be information for changing a spatio-temporal tap arrangement. In the storage unit 11, one or at least two pieces of change information for changing a spatio-temporal tap arrangement may be stored in association with one or at least two system features.

The system features are one or more features from when an image is acquired to when an image is output. The acquiring an image is, for example, capturing an image, reading an image, or the like. The outputting an image is, for example, showing an image to a user, displaying an image on a display screen, or the like. The one or more features from when an image is acquired to when an image is output are, for example, a camera feature, which is a feature of a camera that captures an image, a feature of a transmission line, a feature of an output device, or the like. The system features are, for example, a feature of the entire system from when an image is acquired to when an image is output. The feature of the entire system is, for example, a relationship between the bit precision of an image capturing device, the bit precision of a transmission line, and the bit precision of an output device. When a bit precision (1) of an image capturing device is 14 bits, a bit precision (2) of a transmission line is 10 bits, and a bit precision (3) of an output device is 12 bits, the relationship between the bit precisions may be expressed, for example, as a combination of the bit precisions, i.e., (1)=14·(2)=10·(3)=12, or as a relative increase or decrease, i.e., (1)−(2)=+4, (2)−(3)=−2.

The feature of the entire system is, for example, a relationship between the number of pixels of an image capturing device, the number of pixels of an image format that is used in a transmission line, and the number of pixels of an output device.

The system features preferably include a camera feature. The camera feature is, for example, an optical feature of a camera. The optical feature of a camera is, for example, an optical feature of a lens. The optical feature of a lens is, for example, an MTF or a wavelength feature of a lens. The optical feature of a camera is, for example, a feature of an optical filter of a camera. The feature of an optical filter is, for example, a feature of an optical low-pass filter attached to a sensor, for example, an MTF (modulation transfer function). The optical feature of a camera is, for example, a feature of a shutter. The feature of a shutter is, for example, a shutter speed, a shutter method (a rolling shutter method or a global shutter method), or the like. The camera feature is, for example, information indicating whether or not there is an optical LPF in an image sensor of a camera. The camera feature is, for example, information for specifying the device type of an image sensor. The information for specifying the device type of an image sensor is, for example, "CCD", "CMOS", or the like. The camera feature is, for example, a bit length of a camera. Examples of the camera feature include, in addition to an optical feature of a camera, a feature of conversion from light to electricity of a sensor. The feature of conversion from light to electricity is, for example, a quantization feature, or a spatio-temporal sampling.

The system features preferably include a transmission line feature, which is a feature of a transmission line through which an image is transmitted. The transmission line feature is, for example, information for specifying a coding method, a coding parameter, or a bit rate. The information for specifying a coding method is, for example, "MPEG2", "H.264", "H.265", or the like.

The system features preferably include an output device feature, which is a specific feature of an output apparatus that outputs an image. The output device feature is, for example, a resolution of a display screen, a bit length at an output limit of a display screen, or an output frame rate of a display screen. The output device feature is, for example, a maximum luminance of a display screen, a light source of a display screen, or a drive method of a presentation element. The output device feature is, for example, the type of display screen. The type of display screen is, for example, CRT, liquid crystal, plasma, organic EL, projector, or the like.

The accepting unit 12 accepts various types of information, instructions, or the like. The various types of information, instructions, or the like is, for example, an input image, a system feature, optical signal information, information on the storage unit 11, or the like. The accepting is typically receiving information transmitted via a wired or wireless communication line, but is a concept that encompasses accepting information read from a storage medium such as an optical disk, a magnetic disk, or a semiconductor memory, accepting information input from an input device such as a keyboard, a mouse, or a touch panel, and the like.

The input image accepting unit 121 accepts an input image. The input image is, for example, an image transmitted from an unshown broadcasting apparatus. The input image is, for example, an image stored in a storage medium. The input image accepted by the input image accepting unit 121 is typically two or more input images (which may be referred to as frames or fields), but also may be one input image (which may be referred to as a frame or a field). The multiple frames or fields that are accepted may be simply referred to as input images.

The system feature accepting unit 122 accepts one or at least two system features. The system features are one or at least two features from when an image is acquired to when an image is output.

The system feature accepting unit 122 may accept one or at least two system features from the outside. The system feature accepting unit 122 may receive one or more system features from the outside (e.g., from an unshown broadcasting apparatus). The system feature accepting unit 122 may receive one or more system features together with the input image. That is to say, one or more system features may be associated with the input image.

The system feature accepting unit 122 may read one or more system features from an unshown storage medium.

The system feature accepting unit 122 may accept one or more system features that are input by a user.

The system feature accepting unit 122 may acquire one or more system features associated with an input image. In this case, the accepting unit 12 receives an input image and one or more system features.

Furthermore, the system feature accepting unit 122 may acquire an output device feature, from information on connection with a device to which output is to be performed. For example, the system feature accepting unit 122 may acquire device model information of an output device and the like using EDID (extended display identification data) of HDMI or the like.

Furthermore, the system feature accepting unit 122 may acquire a system feature from an input image. For example, the system feature accepting unit 122 may acquire, from an input image, a coding parameter when the image is transmitted.

Furthermore, the system feature accepting unit 122 may analyze an input image and estimate a system feature. For example, the system feature accepting unit 122 may estimate a lens feature from a resolution appearance at the center of an image and a resolution appearance at a peripheral portion thereof. The system feature accepting unit 122 may estimate a shutter time from a motion vector of an image and a blurring amount in its motion direction. When blurring hardly occurs in an image although a motion between frames is large, it can be estimated that the shutter time is short. That is to say, the system feature accepting unit 122 acquires a motion amount of a subject between frames, and acquires information indicating a blurring level of the subject. A shutter time is acquired using the motion amount of the subject and the information indicating the blurring level. For example, the system feature accepting unit 122 has a correspondence table between a motion amount of a subject, information indicating a blurring level, and a shutter time, and acquires a shutter time corresponding to a motion amount of a subject and information indicating a blurring level, using the correspondence table.

The instruction accepting unit 123 accepts a user instruction. The user instruction is an instruction from a user, and is, for example, an instruction as to whether or not to perform an individual process. The individual process is an optional process. The individual process is typically an optional image process. The instruction to perform an individual process is referred to as an individual process instruction. The individual process instruction is, for example, a flag indicating to perform an individual process. The individual process instruction is, for example, a parameter that is used for an individual process. The individual process instruction is, for example, a weight for an individual process.

There is no limitation on the time when the instruction accepting unit 123 accepts an individual process instruction. Typically, the instruction accepting unit 123 accepts an individual process instruction before the input image accepting unit 121 accepts an input image. Note that an individual process instruction may be accepted after the input image accepting unit 121 accepts an input image and before a process on the input image is started.

The accepting is a concept that encompasses accepting information input from an input device such as a keyboard, a mouse, or a touch panel, receiving information transmitted via a wired or wireless communication line, accepting information read from a storage medium such as an optical disk, a magnetic disk, or a semiconductor memory, and the like.

The processing unit 13 performs various processes. The various processes are, for example, processes that are performed by the first image acquiring unit 131, the second image acquiring unit 132, and the like.

The first image acquiring unit 131 acquires a first image based on the input image. The first image acquiring unit 131 may perform a first image process on the input image, thereby acquiring a first image. The first image acquiring unit 131 may perform a generic process, which is an essential process, on the input image, thereby acquiring a first image. The first image acquiring unit 131 may perform a generic process, which is an essential process, on the input image, and perform a first individual process, which is an optional process, on a result of the generic process, thereby acquiring a first image. The first image acquiring unit 131 may acquire a first image without performing any image process on the input image.

The second image acquiring unit 132 performs an image process that is different from the process that is performed by the first image acquiring unit 131, on the input image or the first image, thereby acquiring a second image. The image process that is different from the process that is performed by the first image acquiring unit 131 also encompasses a case in which the first image acquiring unit 131 does not perform any image process. The second image acquiring unit 132 may perform a second image process that is different from the first image process, on the input image or the first image, thereby acquiring a second image. The second image acquiring unit 132 may perform a second individual process, which is an optional process, on the first image, thereby acquiring a second image. If the user instruction is an individual process instruction, which is an instruction to perform an individual process, the second image acquiring unit 132 may perform a second individual process on the input image, thereby constructing a second image.

The second image acquiring unit 132 performs a second image process on the input image or the first image, thereby acquiring a second image. The second image acquiring unit 132 may perform a generic process on the input image, thereby acquiring a first image, and perform an individual process on the first image, thereby acquiring a second image. The second image acquiring unit 132 may perform an individual process on the first image that is a processing result of the first image acquiring unit 131, thereby acquiring a second image.

The second image acquiring unit 132 may include two or more configurations that respectively perform different image processes on the input image or the first image. In this case, the image output apparatus 1 includes two or more second image acquiring units 132. The image output apparatus 1 acquires two or more second images. The two or more second images are preferably images respectively subjected to different processes, but may include images subjected to the same process.

Furthermore, the second image is preferably an image of a partial spatial region of the first image.

There is no limitation on the processing content of the first image process or the second image process. The process that is included in the first image process or the second image process is, for example, the above-described generic process. The generic process is an essential process that is performed on the input image. It will be appreciated that the generic process is a process that has to be performed regardless of user's preference. The generic process is, for example, a conversion process of the number of pixels in the case in which the input image and the output image have different formats. The generic process is, for example, a distortion removing process on the input image. It will be appreciated that the generic process may include two or more processes. The process that is included in the first image process or the second image process is, for example, the above-described individual process. The individual process is an optional process that is performed on the input image. The individual process is, for example, a process that changes the appearance of the output image. The process that changes the appearance of the output image is, for example, a process that changes the brightness of the output image according to natural laws, or changes the output magnification of the output image as in the case of viewing an object from a position closer to or away from that object.

The process that changes the brightness of the output image according to natural laws is more specifically a process that changes the brightness of an output image while applying constraints such that light emitted from the image does not behave in a very unnatural manner as light in nature. The behaving in a very unnatural manner as light in nature is, for example, the intensity of light that is very unnatural as light in nature, the amount of change in the intensity of light that is very unnatural as light in nature, or the like. It will be appreciated that the individual process may include two or more processes.

Furthermore, the individual process is, for example, a process that brightens an image. The process that brightens an image is, for example, a process that makes a change as in the case in which the amount of light increases to N times. This process is, for example, constructing an image by obtaining, for each pixel or each block, a pixel or a block similar to that observed when the amount of light is actually doubled, in consideration of features of the light source and reflection features of the subject, instead of simply doubling the luminance values of all pixels.

Furthermore, the individual process is, for example, a process that removes camera noise, a process that removes coding distortion, a process that changes an optical environment, or the like. The process that changes an optical environment is, for example, a process that changes an image so as to increase the shading level of the image, or a process that changes an image so as to decrease the shading level of the image. The process that changes the shading level of the image is, for example, a process that adjusts the contrast in each block constituting the image. The process that changes an optical environment is, for example, a process that virtually changes the position of a light source. The process that changes the position of a light source is, for example, a process that changes an orientation or a length of a shadow in an image. The individual process may be, for example, a process that detects an orientation of a subject in an image, and adjusts the intensity of light reflection according to the orientation.

Furthermore, the individual process or the generic process may include a natural rule obeying process, which will be described below. The natural rule obeying process is a process that converts image signals in consideration of behavior of light in nature. The natural rule obeying process will be described later in detail.

In the natural rule obeying process, the processing unit 13 (the first image acquiring unit 131 and/or the second image acquiring unit 132) acquires optical signal information corresponding to electrical signal information that is acquired from the input image accepted by the input image accepting unit 121. The processing unit 13 typically acquires optical signal information corresponding to electrical signal information that is acquired from the input image accepted by the input image accepting unit 121, using the correspondence information in the storage unit 11. More specifically, the processing unit 13 selects, for example, a correspondence record corresponding to electrical signal information that matches or is closest to electrical signal information that is acquired from the input image accepted by the input image accepting unit 121, and acquires optical signal information corresponding to the selected correspondence record. The processing unit 13 may acquire, for example, an operation expression corresponding to electrical signal information that is acquired from the input image accepted by the input image accepting unit 121. The processing unit 13 may select a correspondence record corresponding to electrical signal information that matches or is closest to electrical signal information that is acquired from the input image accepted by the input image accepting unit 121, and acquire optical signal information that is a process identifier corresponding to the selected correspondence record.

Next, the processing unit 13 converts the input image using the acquired optical signal information. The processing unit 13 performs a conversion process that acquires, for example, a first image or a second image (hereinafter, both or any one of them will be referred to as an "output image" as appropriate) from the input image, using the optical signal information. The processing unit 13 typically performs a conversion process that acquires an output image from the input image, using the input image accepted by the input image accepting unit 121 and the optical signal information acquired by the processing unit 13. The input image is an image that is delivered to the natural rule obeying process, and the output image is an image as a result of the natural rule obeying process.

The conversion process is, for example, a later-described quality improving process, a later-described resolution increasing process, a later-described noise removing process, or the like, but there is no limitation on the processing content. The conversion process is, for example, a process that, after an input image is subjected to a conventional image conversion process (e.g., conventional conversion processes described in JP 2012-252685, JP 2012-252686, WO 2013/061810, etc.), determines whether or not an image obtained through the conversion has a signal that is out of an acceptable range as an electrical signal, and, if there is a signal that is out of the allowable range, performs quantization again such that the signal is not truncated. The processing unit 13 may perform a conversion process that acquires an output image, by converting the input image using the acquired operation expression. The processing unit 13 may perform a process that is identified by the acquired process identifier, and perform a conversion process that acquires an output image from the input image. In this case, for example, the processing unit 13 calls a function (processing) corresponding to the acquired process identifier, and gives the input image to the function, thereby acquiring an output image. The processing unit 13 may perform, for example, a quality improving process that converts the input image into an image with a higher quality, using the acquired optical signal information, thereby acquiring an output image. The improving the quality is a process that converts an image into an image with a more specific material appearance, a better sense of distance, and the like. The quality improving process is a known technique, and thus a detailed description thereof has been omitted. The processing unit 13 may perform, for example, a resolution increasing process that converts the input image into an image with a higher resolution, using the acquired optical signal information, thereby acquiring an output image. The resolution increasing process is a known technique, and thus a detailed description thereof has been omitted. For example, the processing unit 13 may perform, for example, a noise removing process on the input image, using the acquired optical signal information, thereby acquiring an output image. The noise removing process is a known technique, and thus a detailed description thereof has been omitted. The processing unit 13 may perform, for example, a first conversion process on the input image and acquire an output image candidate, determine whether or not signal intensity of the output image candidate is within a range indicated by the range information, and, if it is determined that the signal intensity of the output image candidate is not within the range indicated by the range information, quantize the input image again and convert the input image such that the signal intensity is within the range indicated by the range information, thereby acquiring an output image. The first conversion process is typically a conventional image conversion process. The first conversion process is, for example, the above-described conventional conversion process.

Furthermore, the individual process or the generic process may include a system feature using process, which will be described below. The system feature using process is a process that acquires an output image by performing a conversion process on an input image using one or more system features. The system feature using process will be described later in detail. The input image is an image that is delivered to the system feature using process, and the output image is an image as a result of the system feature using process.

In the system feature using process, the processing unit 13 (the first image acquiring unit 131 and/or the second image acquiring unit 132) performs a conversion process that acquires an output image from the input image, using a system feature. The system feature is typically one or more system features accepted by the system feature accepting unit 122. More specifically, the processing unit 13 may select an LUT corresponding to the one or more system features accepted by the system feature accepting unit 122, from among the two or more LUTs in the storage unit 11, and perform a conversion process that acquires an output image from the input image, using the selected look-up table. The processing unit 13 may acquire change information corresponding to the one or more system features accepted by the system feature accepting unit 122, change an image conversion operation expression, using the change information, and perform a conversion process that acquires an output image from the input image, using the changed image conversion operation expression. The processing unit 13 may acquire change information corresponding to the one or more system features accepted by the system feature accepting unit 122, and perform a conversion process that acquires an output image from the input image, using the change information. In the system feature using process, the processing unit 13 preferably performs the above-described processes, using two or more types of system features.

The output unit 14 outputs a first image and one or more second images. The output unit 14 may output two or more second images respectively acquired by two or more second image acquiring units 132 and a first image. The output unit 14 preferably outputs a first image and one or more second images to the same display screen. The output unit 14 outputs a first image and one or more second images, to the same display screen in PinP.

The output is a concept that encompasses display on a display screen, projection using a projector, printing by a printer, output of a sound, transmission to an external apparatus, accumulation in a storage medium, delivery of a processing result to another processing apparatus or another program, and the like.

The storage unit 11 is preferably a non-volatile storage medium, but may be realized also by a volatile storage medium.

There is no limitation on the procedure in which information is stored in the storage unit 11. For example, information may be stored in the storage unit 11 via a storage medium, information transmitted via a communication line or the like may be stored in the storage unit 11, or information input via an input device may be stored in the storage unit 11.

The accepting unit 12 and the instruction accepting unit 123 may be realized by device drivers for an input part such as a keyboard, control software for a menu screen, wireless or wired communication parts, broadcast receiving parts, or the like.

The input image accepting unit 121 and the system feature accepting unit 122 may be realized, for example, by a wired or wireless communication part, broadcasting part, or the like.

The processing unit 13, the first image acquiring unit 131, and the second image acquiring unit 132 may be realized typically by MPUs, memories, or the like. Typically, the processing procedure of the processing unit 13 is realized by software, and the software is stored in a storage medium such as a ROM. Note that the processing procedure may be realized also by hardware (dedicated circuits).

The output unit 14 may be considered to include or not to include an output device, such as a display screen or a speaker. The output unit 14 may be realized, for example, by driver software for an output device, a combination of driver software for an output device and the output device, or the like.

Next, an operation of the image output apparatus 1 will be described with reference to the flowchart in FIG. 2.

(Step S201) The input image accepting unit 121 determines whether or not an input image has been accepted. If an input image has been accepted, the procedure advances to step S202, and, if not, the procedure advances to step S209.

(Step S202) The first image acquiring unit 131 performs a first image process on the input image accepted in step S201, thereby acquiring a first image. Later, an example of a first image process will be described with reference to the flowchart in FIG. 3.

(Step S203) The output unit 14 outputs the first image acquired in step S202. Information indicating an output destination (e.g., an IP address or a MAC address of a display screen to which the image is to be output, etc.) and information indicating an output mode (e.g., a position or a size of a window to which the first image is to be output, etc.) of the first image are stored in the storage unit 11. The output unit 14 reads the information indicating an output destination and the information indicating an output mode, and outputs the first image according to the information.

(Step S204) The second image acquiring unit 132 substitutes 1 for a counter i.

(Step S205) The second image acquiring unit 132 determines whether or not to perform an $i^{-th}$ second image process. If an $i^{-th}$ second image process is to be performed, the procedure advances to step S206, and, if not, the procedure returns to step S201. Whether or not to perform an $i^{-th}$ second image process is determined, for example, according to whether or not an individual process instruction corresponding to the $i^{-th}$ second image process is stored in the storage unit 11. Whether or not to perform an $i^{-th}$ second image process may be determined, for example, according to whether or not the image output apparatus 1 includes an $i^{-th}$ second image acquiring unit 132.

(Step S206) The second image acquiring unit 132 performs a second image process on the input image accepted in step S201 or the first image acquired in step S202, thereby acquiring a second image. Later, an example of a second image process will be described with reference to the flowchart in FIG. 4.

(Step S207) The output unit 14 outputs the second image acquired in step S206. The output unit 14 preferably outputs a first image and one or more second images to the same display screen. Information indicating an output destination (e.g., an IP address or a MAC address of a display screen to which the image is to be output, etc.) and information indicating an output mode (e.g., a position or a size of a window to which the second image is to be output, etc.) of the second image are stored in the storage unit 11. The output unit 14 reads the information indicating an output destination and the information indicating an output mode, and acquires a second image according to the information. Information indicating an output destination and information indicating an output mode of each $i^{-th}$ second image may be stored in association with information for identifying the second image acquiring unit 132, or may be stored in association with an individual process instruction corresponding to the $i^{-th}$ second image process.

(Step S208) The second image acquiring unit 132 increments the counter i by 1. The procedure returns to step S205.

(Step S209) The instruction accepting unit 123 determines whether or not an individual process instruction from a user has been accepted. If an individual process instruction has been accepted, the procedure advances to step S210, and, if not, the procedure returns to step S201. The individual process instruction may be accepted in association with information for identifying any one of the first image, the first image process, and the first image acquiring unit 131, or may be accepted in association with information for identifying any one or more second images, any one or more second image processes, or any one or more second image acquiring units 132. The individual process instruction typically contains an individual process identifier for identifying a process. The process identifier is, for example, a function name, an ID, a pointer to a process, an address, or the like.

(Step S210) The processing unit 13 accumulates the individual process instruction accepted in step S209, in the storage unit 11. The procedure returns to step S201. The individual process instruction may be accumulated in association with information for identifying any one of the first image, the first image process, and the first image acquiring unit 131, or may be accumulated in association with information for identifying any one or more second images, any one or more second image processes, or any one or more second image acquiring units 132.

Figure 2:
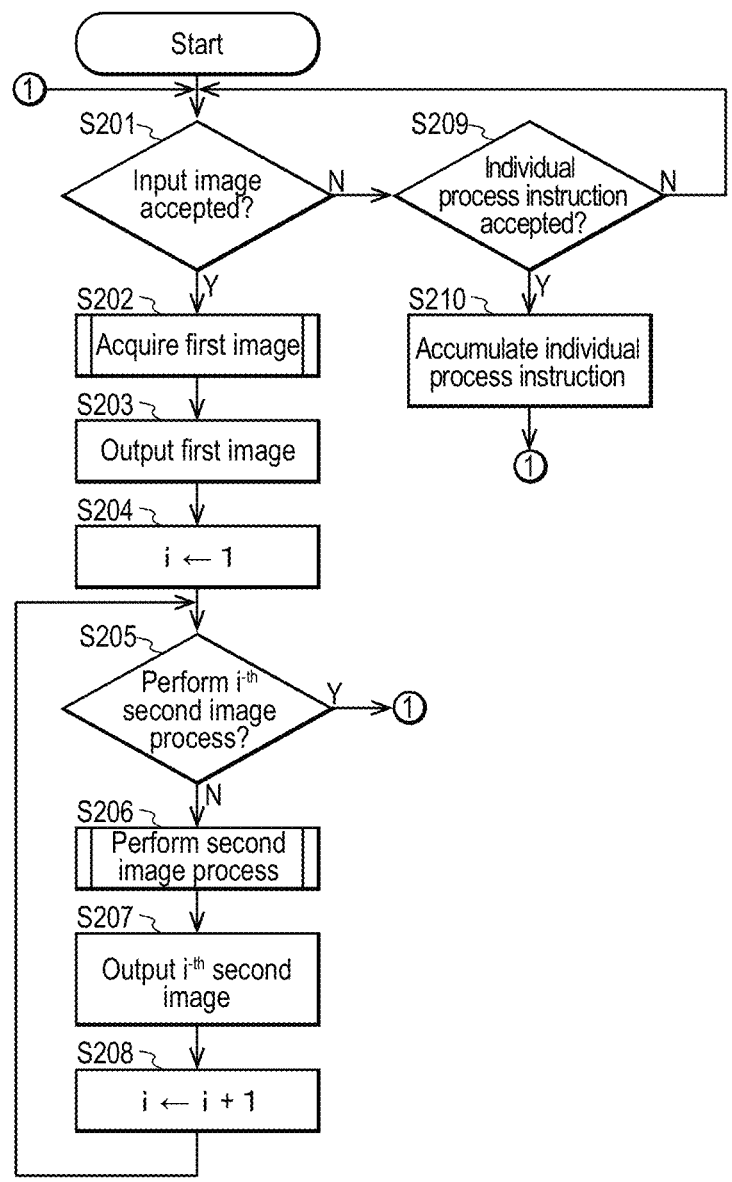
FIG. 2 is a flowchart illustrating an operation of the image output apparatus 1 in the embodiment.

In the flowchart in FIG. 2, the first image and the second image are sequentially output in steps S203 and S207. However, for example, output images may be buffered in an output memory in steps S203 and S207, and image information in the output memory may be output after all second image processes are performed. That is to say, it is sufficient that the first image and the second image are output as a result.

Furthermore, in the flowchart in FIG. 2, an individual process instruction may be accepted even while an input image is being accepted.

Note that the procedure is terminated by powering off or an interruption at the end of the process in the flowchart in FIG. 2.

Figure 3:
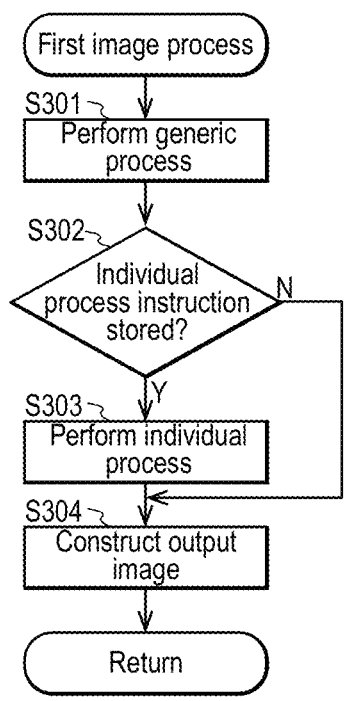
FIG. 3 is a flowchart illustrating an example of a first image process in the embodiment.

Next, an example of a first image process in step S202 will be described with reference to the flowchart in FIG. 3.

(Step S301) The first image acquiring unit 131 performs a generic process on the input image accepted in step S201, thereby acquiring first processing information.

(Step S302) The first image acquiring unit 131 determines whether or not an individual process instruction associated with information for identifying any one of the first image, the first image process, and the first image acquiring unit 131 is stored in the storage unit 11. If such an individual process instruction is stored, the procedure advances to step S303, and, if not, the procedure returns to the upper-level processing. The individual process instruction is an instruction to perform one or at least two individual processes.

(Step S303) The first image acquiring unit 131 performs an individual process on the input image accepted in step S201 or the first processing information acquired in step S301, thereby acquiring second processing information. The individual process that is performed is one or at least two individual processes.

(Step S304) If an individual process is performed in step S303, the first image acquiring unit 131 constructs a first image, using the first processing information acquired in step S301 and the second processing information acquired in step S303. If an individual process is not performed in step S303, the first image acquiring unit 131 acquires a first image, using the first processing information acquired in step S301. In this case, the first image may be the same as the first processing information. The procedure returns to the upper-level processing.

Next, an example of a second image process in step S206 will be described with reference to the flowchart in FIG. 4. In the flowchart in FIG. 4, a description of the same processes as those in the flowchart in FIG. 3 will be omitted.

(Step S401) The second image acquiring unit 132 substitutes 1 for a counter i.

(Step S402) The second image acquiring unit 132 determines whether or not an $i^{-th}$ individual process instruction is stored in the storage unit 11. If an $i^{-th}$ individual process instruction is stored, the procedure advances to step S403, and, if not, the procedure advances to step S405.

(Step S403) The $i^{-th}$ second image acquiring unit 132 performs an individual process on the input image accepted in step S201, the first processing information, or an execution result of the individual process corresponding to the $(i-1)^{-th}$ individual process instruction. The execution result of the last individual process is second processing information. The individual process that is performed is one or at least two individual processes.

(Step S404) The second image acquiring unit 132 increments the counter i by 1. The procedure returns to step S402.

(Step S405) If an individual process is performed in step S403, the second image acquiring unit 132 constructs a second image, using the first processing information and the second processing information. The procedure returns to the upper-level processing.

Figure 4:
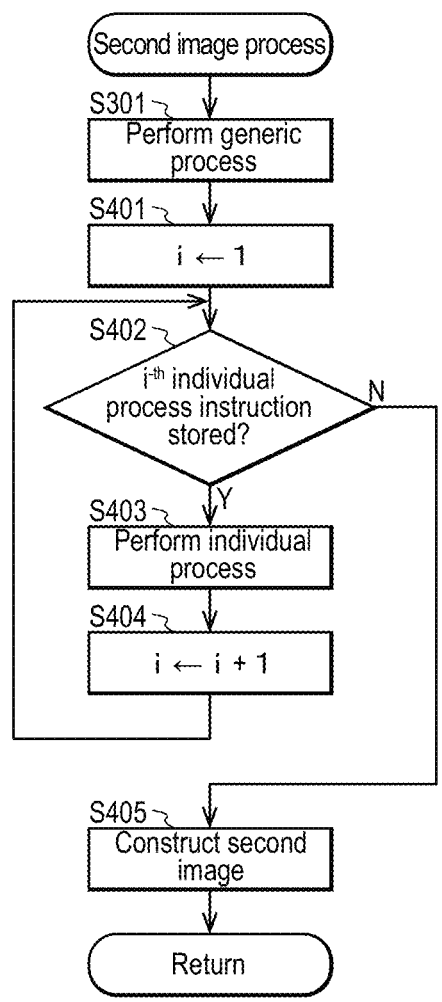
FIG. 4 is a flowchart illustrating an example of a second image process in the embodiment.

In step S403 of the flowchart in FIG. 4, the individual process corresponding to a stored individual process instruction is performed, and thus, for example, it will be appreciated that there may be a case in which an individual process 1 and an individual process 3 are performed, whereas an individual process 2 is not performed.

Figure 5:
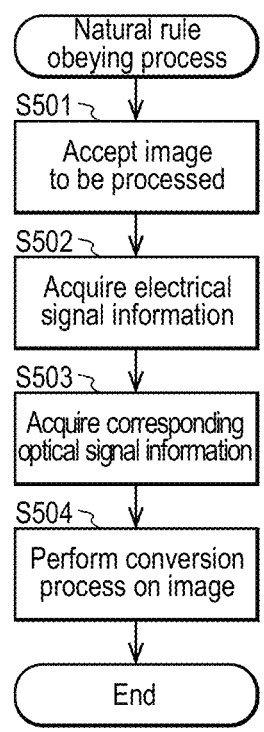
FIG. 5 is a flowchart illustrating a natural rule obeying process in the embodiment.

Next, a natural rule obeying process, which is an example of the individual process or the generic process, will be described with reference to the flowchart in FIG. 5. The natural rule obeying process is performed by the processing unit 13 (the first image acquiring unit 131 and/or the second image acquiring unit 132).

(Step S501) The processing unit 13 accepts an image that is to be processed. The image that is to be processed is, for example, an input image, first processing information, an image that is being converted, or the like.

(Step S502) The processing unit 13 acquires one or more pieces of electrical signal information, from the image accepted in step S501.

(Step S503) The processing unit 13 acquires optical signal information corresponding to the electrical signal information acquired in step S502, using the correspondence information in the storage unit 11.

(Step S504) The processing unit 13 performs a conversion process that acquires an output image from the image accepted in step S201, using the optical signal information acquired in step S503. The output image may be an image that is output to a display screen, or may be an image that is passed to the next process.

Next, a specific example of the natural rule obeying process will be described.

It is assumed that, in the storage unit 11, correspondence information indicating correspondence between an optical signal feature and an electrical signal feature is stored. The optical signal feature is information indicating that the resolution is infinite, or information indicating that there is no upper limit or lower limit of a signal range. The electrical signal feature is information indicating that quantization was performed at 10 bits, or information indicating a signal range (64 to 940). The correspondence information is, for example, information indicating correspondence between a range of electrical signal intensity and a range of optical signal intensity. The correspondence information is, for example, information indicating correspondence between electrical signal intensity and optical signal intensity.

Furthermore, it is assumed that conversion process in this specific example is a process that, after an input image is subjected to a conventional image conversion process (first conversion process, for example, the above-described conventional conversion process), determines whether or not an image obtained through the conversion has a signal that is out of an acceptable range as an electrical signal, and, if there is a signal that is out of the allowable range, performs quantization again such that the signal is not truncated.

Figure 6:
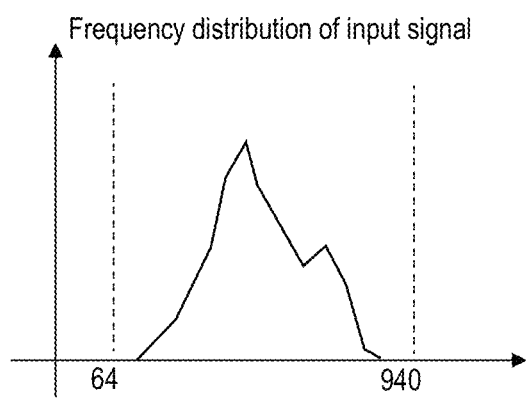
FIG. 6 is a graph showing frequency distribution of signal levels of an input image that is received in the embodiment.

It is assumed that the input image accepting unit 121 has received an input image. Furthermore, it is assumed that frequency distribution of signal levels of the received input image is frequency distribution as shown in FIG. 6. In FIG. 6, the horizontal axis indicates signal intensity, and the vertical axis indicates frequency.

Figure 7:
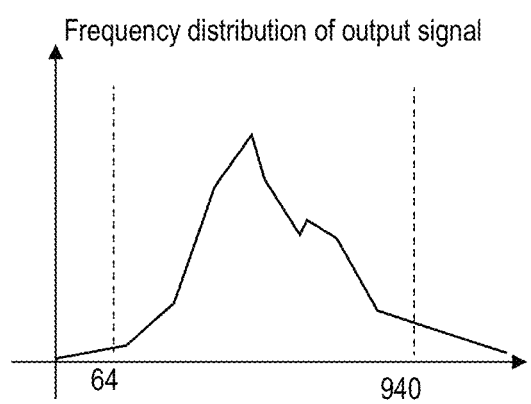
FIG. 7 is a graph showing frequency distribution of signal levels of an output image candidate in the embodiment.

Next, it is assumed that the processing unit 13 acquires an output image candidate, by performing the above-described conventional conversion process on the input image. It is assumed that the output image candidate has frequency distribution as shown in FIG. 7.

Next, the processing unit 13 acquires signal intensity (electrical signal intensity) from the input image.

Next, the processing unit 13 acquires optical signal intensity corresponding to the acquired electrical signal intensity, from the correspondence information in the storage unit 11.

The processing unit 13 converts the input image such that its intensity conforms to the optical signal intensity, thereby obtaining an output image candidate. Next, the processing unit 13 determines whether or not the electrical signal intensity of the output image candidate is within the range of the information indicating the signal range. It is assumed that the processing unit 13 determines that, for example, the signal intensity of the output image candidate is not within the range (64 to 940) of the information indicating the signal range.

Figure 8:
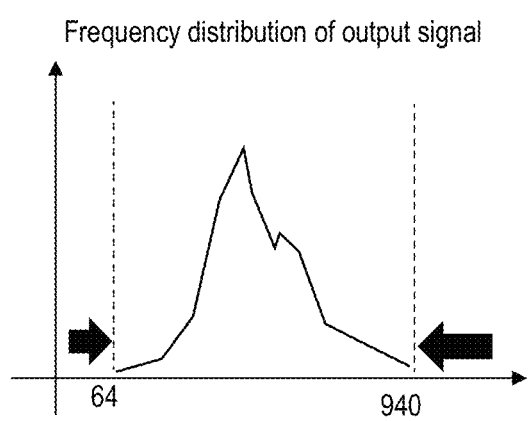
FIG. 8 is a graph showing frequency distribution of signal levels of an output image candidate in the embodiment.

Next, the processing unit 13 quantizes the input image again and converts the input image such that the signal intensity is within the range of the information indicating the signal range, thereby acquiring an output image. The output image has, for example, frequency distribution as shown in FIG. 8.

Figure 9:
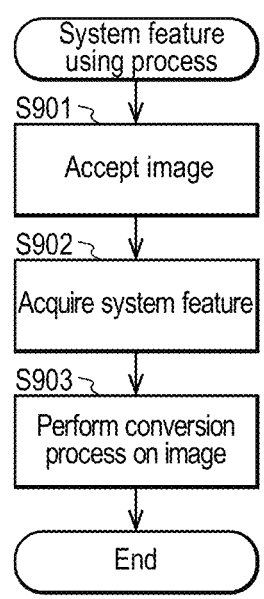
FIG. 9 is a flowchart illustrating a system feature using process in the embodiment.

Next, a system feature using process, which is an example of the individual process or the generic process, will be described with reference to the flowchart in FIG. 9. The system feature using process is performed by the processing unit 13 (the first image acquiring unit 131 and/or the second image acquiring unit 132).

(Step S901) The processing unit 13 accepts an image that is to be processed. The image that is to be processed is, for example, an input image, first processing information, an image that is being converted, or the like.

(Step S902) The processing unit 13 acquires one or more system features. The processing unit 13 may accept one or at least two system features from the outside. The processing unit 13 may receive one or more system features from the outside (e.g., from an unshown broadcasting apparatus).

(Step S903) The processing unit 13 converts the image accepted in step S901, using the one or more system features acquired in step S902, thereby acquiring an output image. The output image may be an image that is output to a display screen, or may be an image that is passed to the next process.

Next, a detailed structure example will be described in which the second image acquiring unit 132 performs both the generic process and the individual process, thereby acquiring a second image. Hereinafter, three structure examples will be described. The three structure examples below may be the structure of the first image acquiring unit 131.

Structure Example 1

Figure 10:
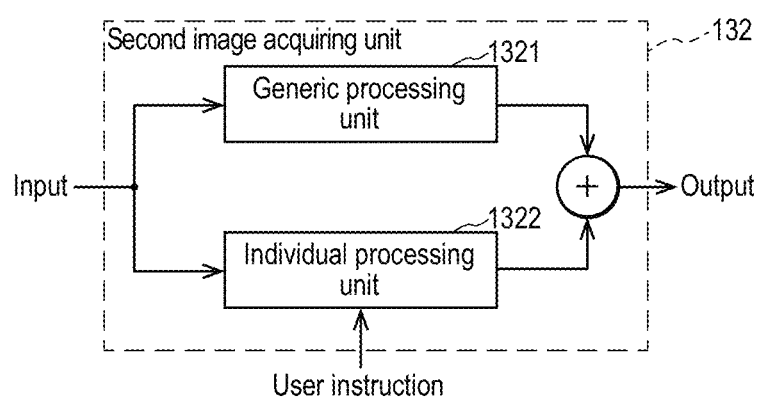
FIG. 10 is a diagram showing a first structure example of a second image acquiring unit 132 in the embodiment.

FIG. 10 shows a first structure example of the second image acquiring unit 132. In FIG. 10, the second image acquiring unit 132 includes a generic process unit 1321 and an individual process unit 1322.

FIG. 10 shows that the second image acquiring unit 132 integrates input (e.g., an input image) with first processing information, which is a processing result of the generic process unit 1321, and second processing information, which is a processing result of the individual process unit 1322, thereby obtaining a second image as output. FIG. 10 shows that whether or not the individual process unit 1322 operates is changed by a user instruction. The integrating first processing information and second processing information is, for example, adding pixel values of an image of the first processing information and an image of the second processing information. The integrating first processing information and second processing information is, for example, a process that acquires representative values (e.g., average values, or weighted average values, etc.) of one or more feature values of the first processing information that is an image and one or more feature values of the second processing information that is an image, and constructs a second image using the one or more representative values. Examples of the one or more feature values include a vicinity feature value, which is a feature value of part of one or more images, and a whole feature value, which is a feature value of the whole of one or more images. Examples of the vicinity feature value include a pixel value, an activity, a spatio-temporal correlation, a motion vector, and a frequency distribution. Furthermore, examples of the activity include a maximum value and a minimum value of multiple pixels, a dynamic range (DR), and a difference between multiple pixels. The difference between multiple pixels may be a difference between multiple pixels in a space, may be a difference between multiple pixels in the time direction, or may be a difference between multiple pixels in a space and in the time direction. Furthermore, examples of the whole feature value include a pixel value distribution in the whole of an image, a motion vector distribution in the whole of an image, a spatio-temporal correlation of the whole of one or at least two images, a noise amount of the whole of an image, an image format, information relating to edition of the whole of an image (whether or not PinP is selected, whether or not PoutP is selected, whether or not there is text superimposed on the image, etc.), content information relating to a content, which is one or more images, and a pattern detection result (face, etc.). Herein, the content information refers to, for example, the genres, the titles, and the names of people starring in programs listed in an electronic program guide (EPG). Note that the one or more feature values are also referred to as feature vectors as appropriate.

Structure Example 2

Figure 11:
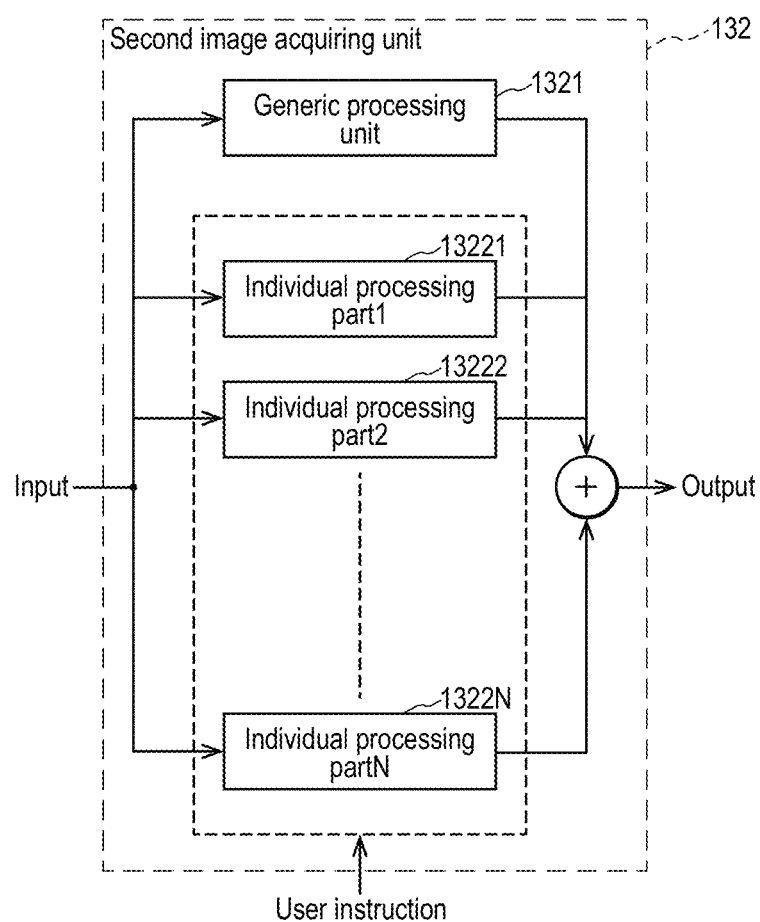
FIG. 11 is a diagram showing a second structure example of the second image acquiring unit 132 in the embodiment.

FIG. 11 shows a second structure example of the second image acquiring unit 132. In FIG. 11, the second image acquiring unit 132 includes a generic process unit 1321 and two or more individual processing parts (13221, 13222, . . . , and 1322N).

FIG. 11 shows that the second image acquiring unit 132 integrates input (e.g., an input image) with first processing information, which is a processing result of the generic process unit 1321, and one or at least two pieces of second processing information, which are processing results of the one or more individual processing parts 1322, thereby obtaining a second image. FIG. 11 shows that whether or not each of the one or more individual processing parts 1322 operates is changed by a user instruction. The process that integrates first processing information and one or more pieces of second processing information is, for example, a process that acquires representative values (e.g., average values, or weighted average values, etc.) of one or more feature values of the first processing information that is an image and one or more feature values of each of the one or more pieces of second processing information that are images, and constructs a second image using the one or more representative values.

Structure Example 3

Figure 12:
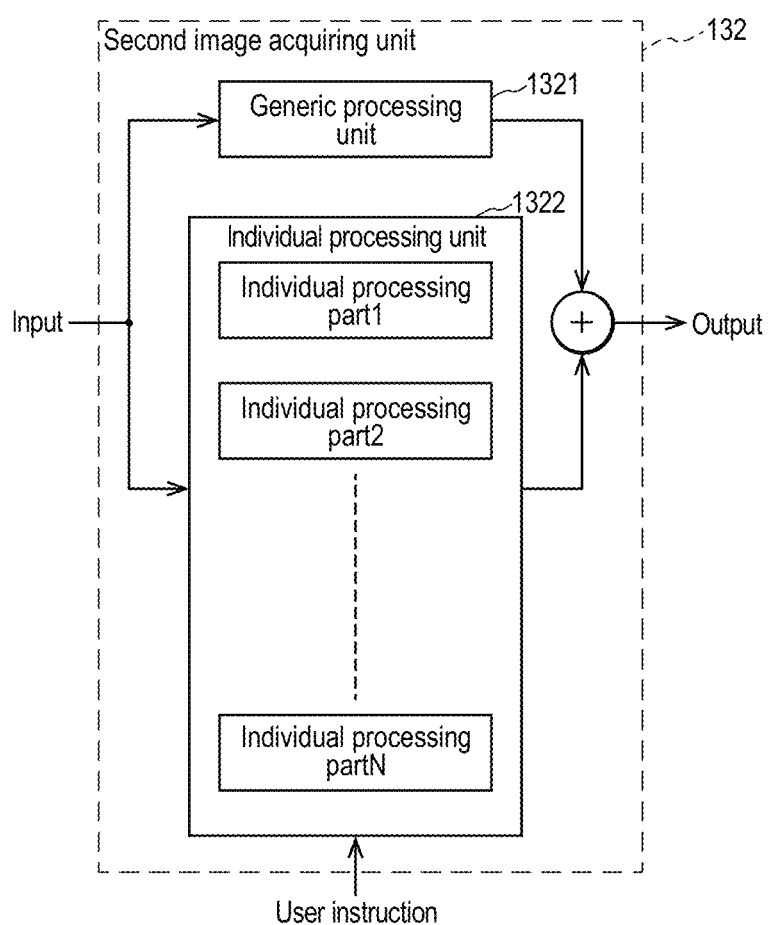
FIG. 12 is a diagram showing a third structure example of the second image acquiring unit 132 in the embodiment.

FIG. 12 shows a third structure example of the second image acquiring unit 132. In FIG. 12, the second image acquiring unit 132 includes the generic process unit 1321 and the individual process unit 1322. The individual process unit 1322 includes two or more individual processing parts (13221, 13222, . . . , and 1322N).

FIG. 12 shows that the second image acquiring unit 132 integrates input (e.g., an input image) with a processing result of the generic process unit 1321 and one processing result of the one or more individual processing parts, thereby obtaining a second image. FIG. 12 shows that whether or not each of the one or more individual processing parts operates is changed by a user instruction.

Hereinafter, two specific operations of the image output apparatus 1 in this embodiment will be described. Specific Example 1 is an example in which the image output apparatus 1 outputs a first image and a second image to two different display apparatuses. Specific Example 2 is an example in which the image output apparatus 1 outputs a first image and two second images to the same display apparatus.

Specific Example 1

It is assumed that a user has performed input (input of a user instruction (1)) that sets the individual process 1, as an individual process on a first image, to the image output apparatus 1. Furthermore, it is assumed that the user has performed input (input of a user instruction (2)) that sets the individual process 1, the individual process 2, and the individual process 3, as individual processes on a second image, to the image output apparatus 1. The instruction accepting unit 123 accepts the individual process instructions. Next, the processing unit 13 accumulates the accepted individual process instructions, in the storage unit 11. It is assumed that, in the storage unit 11, an image process management table shown in FIG. 13 is stored. The image process management table is a table for managing a generic process and an individual process that are performed in order to acquire a first image and a second image.

FIG. 13 shows that the first image acquired by performing the generic process and the individual process 1 is displayed on a display apparatus 1. FIG. 13 shows that the second image acquired by performing the generic process, the individual process 1, the individual process 2, and the individual process 3 is displayed on a display apparatus 2. The generic process is, for example, a distortion removing process on an image. The individual process 1 is, for example, a noise removing process. The individual process 2 is, for example, a natural rule obeying process. The individual process 3 is, for example, a system feature using process.

It is assumed that, in this situation, the input image accepting unit 121 has received an input image. The first image acquiring unit 131 performs the generic process and the individual process 1 on the input image while referring to the image process management table in FIG. 13, thereby obtaining a first image. The first image acquiring unit 131 may sequentially perform the generic process and the individual process 1 on the input image, thereby obtaining a first image. The first image acquiring unit 131 may separately perform the generic process and the individual process 1 on the input image, thereby acquiring two processing results, and integrate the two processing results, thereby acquiring a first image. The integrating multiple processing results is as described above. Each processing result is, for example, first processing information or second processing information.

Next, the output unit 14 outputs the acquired first image to the display apparatus 1.

Furthermore, the second image acquiring unit 132 performs the generic process, the individual process 1, the individual process 2, and the individual process 3 on the input image while referring to the image process management table in FIG. 13, thereby obtaining a second image. The second image acquiring unit 132 may sequentially perform the generic process, the individual process 1, the individual process 2, and the individual process 3 on the input image, thereby acquiring a second image. The second image acquiring unit 132 may separately perform the generic process, the individual process 1, the individual process 2, and the individual process 3 on the input image, thereby acquiring four processing results, and integrate the four processing results, thereby acquiring a second image.

Next, the output unit 14 outputs the acquired second image to the display apparatus 2.

Figure 14:
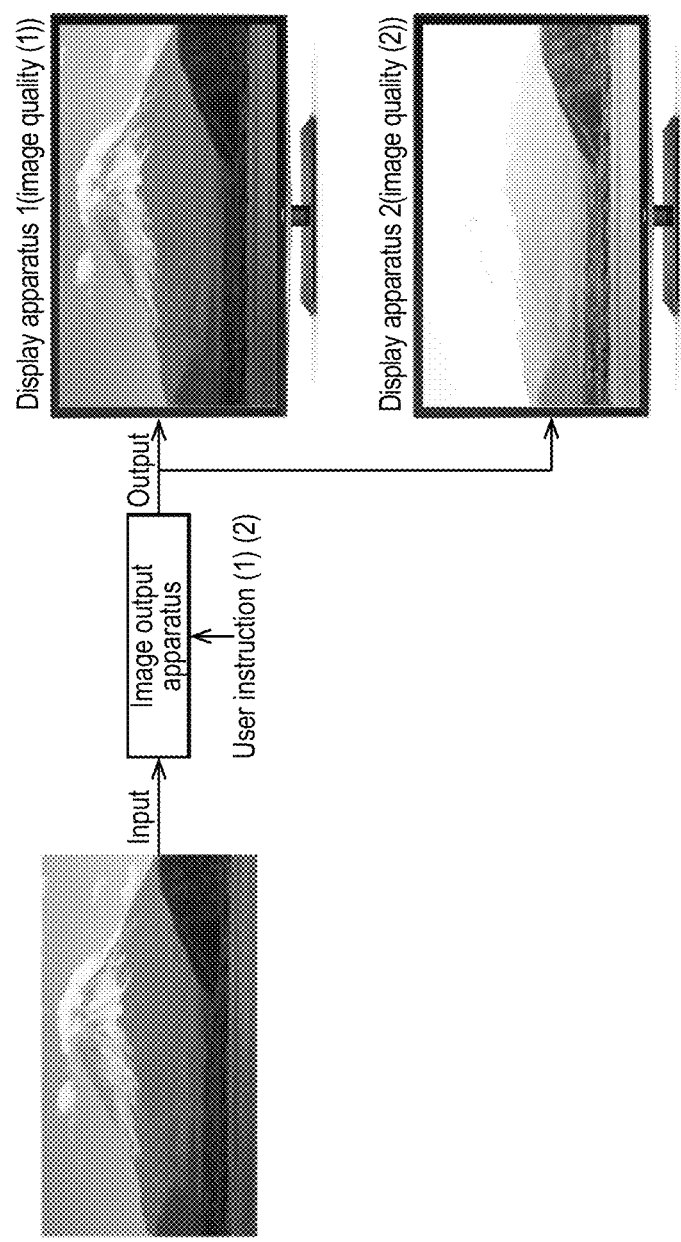
FIG. 14 is a diagram illustrating the outline of a process of the image output apparatus 1 in the embodiment.

Through the above-described processing, as shown in FIG. 14, a first image and a second image acquired from the input image through different processes are displayed on different display apparatuses. The first image is an image with an image quality (1), and the second image is an image with an image quality (2).

Specific Example 2

It is assumed that a user has performed input (input of a user instruction (1)) that sets the individual process 1, as an individual process on a first image, to the image output apparatus 1. Furthermore, it is assumed that the user has performed input (input of a user instruction (2)) that sets the individual process 2, as an individual process on a second image (1), to the image output apparatus 1. Furthermore, it is assumed that the user has performed input (input of a user instruction (3)) that sets the individual process 3, as an individual process on a second image (2), to the image output apparatus 1. It is assumed that the user has performed input of display modes of the first image, the second image (1), and the second image (2), to the image output apparatus 1. Each display mode is input of a position and a size at which an image is displayed. The position is, for example, the upper left coordinates of the display screen, and the size is the window size, such as "vertical×horizontal". Next, the processing unit 13 accumulates the accepted individual process instructions, display mode, and the like, in the storage unit 11. It is assumed that, in the storage unit 11, an image process management table shown in FIG. 15 is stored. The image process management table is a table for managing a generic process and an individual process that are performed in order to acquire images. The image process management table is a table for managing an output mode of each image.

FIG. 15 shows that the first image acquired by performing the generic process and the individual process 1 is displayed in a full screen size on the entire display screen. FIG. 15 shows that the second image (1) acquired by performing the generic process and the individual process 2 is displayed in a window with a size of "$a_1 \times b_1$" at a position indicated as $(x_1, y_1)$. Furthermore, FIG. 15 shows that the second image (2) acquired by performing the generic process and the individual process 3 is displayed in a window with a size of "$a_2 \times b_2$" at a position indicated as $(x_2, y_2)$. The generic process is, for example, a conversion process of the number of pixels. The individual process 1 is, for example, a noise removing process. The individual process 2 is, for example, a process that changes the magnification of the output (an enlarging process, in this example). The individual process 3 is, for example, a process that changes the brightness of the output image according to natural laws.

It is assumed that, in this situation, the input image accepting unit 121 has received an input image. The first image acquiring unit 131 performs the generic process and the individual process 1 on the input image while referring to the image process management table in FIG. 15, thereby obtaining a first image. The output unit 14 outputs the acquired first image to the full screen. The first image acquiring unit 131 may sequentially perform the generic process and the individual process 1 on the input image, thereby obtaining a first image. The first image acquiring unit 131 may separately perform the generic process and the individual process 1 on the input image, thereby acquiring two processing results, and integrate the two processing results, thereby acquiring a first image.

Next, the output unit 14 outputs the acquired first image to the display apparatus 1.

Furthermore, the second image acquiring unit 132 performs the generic process and the individual process 2 on the input image while referring to the image process management table in FIG. 15, thereby obtaining a second image (1). The second image acquiring unit 132 may sequentially perform the generic process and the individual process 2 on the input image, thereby acquiring a second image (1). The second image acquiring unit 132 may separately perform the generic process and the individual process 2 on the input image, thereby acquiring two processing results, and integrate the two processing results, thereby acquiring a second image (1).

Next, the output unit 14 sets a window with a size of "$a_1 \times b_1$" at a position indicated as $(x_1, y_1)$, and outputs the second image (1) to the window.

Furthermore, the second image acquiring unit 132 performs the generic process and the individual process 3 on the input image while referring to the image process management table in FIG. 15, thereby obtaining a second image (2). The second image acquiring unit 132 may sequentially perform the generic process and the individual process 3 on the input image, thereby acquiring a second image (2). The second image acquiring unit 132 may separately perform the generic process and the individual process 3 on the input image, thereby acquiring two processing results, and integrate the two processing results, thereby acquiring a second image (2).

Next, the output unit 14 sets a window with a size of "$a_2 \times b_2$" at a position indicated as $(x_2, y_2)$, and outputs the second image (2) to the window.

Figure 16:
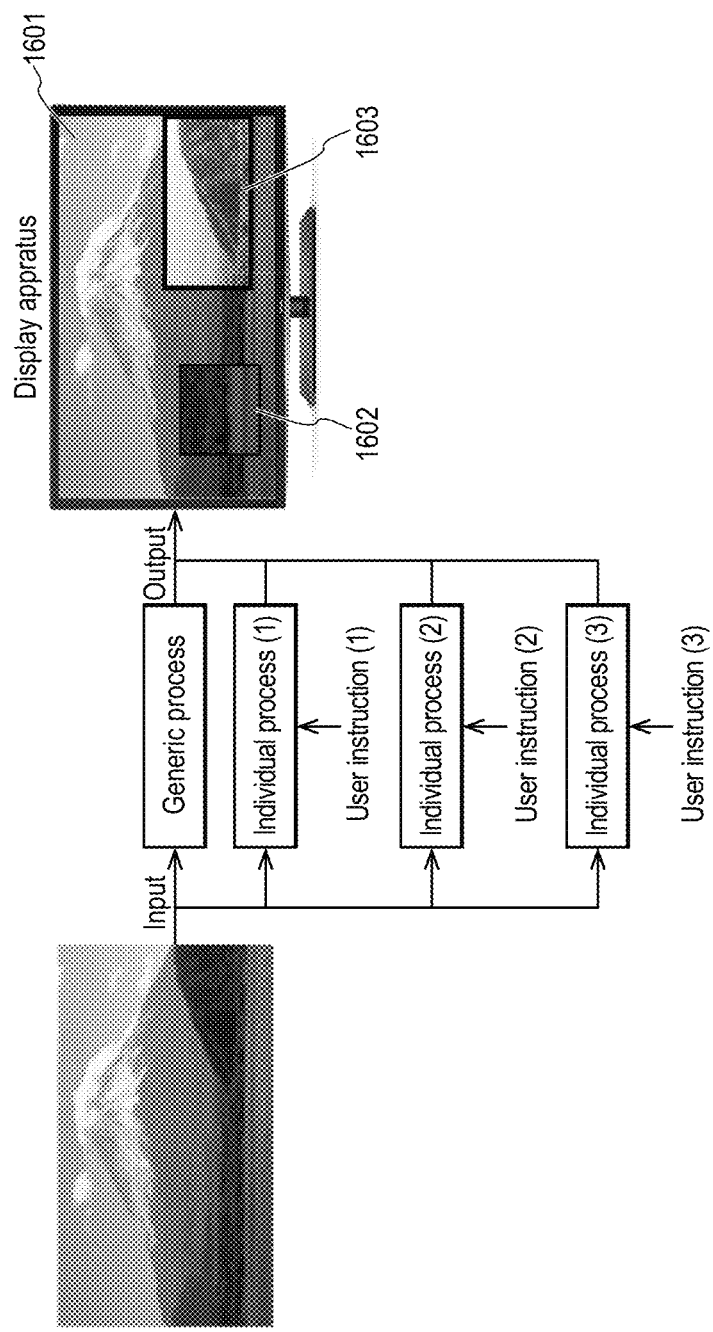
FIG. 16 is a diagram illustrating the outline of a process of the image output apparatus 1 in the embodiment.

Through the above-described processing, as shown in FIG. 16, a first image 1601, a second image (1) 1602, and a second image (2) 1603 acquired from an input image through different processes are displayed on the same display apparatus. In FIG. 16, the second image (1) 1602 and the second image (2) 1603 are images of a partial spatial region of the first image.

In the above-described specific examples, the first image acquiring unit 131 may acquire the input image as a first image without performing any process. In the above-described specific examples, the first image acquiring unit 131 may acquire a first image by performing only the generic process on the input image.

As described above, according to this embodiment, it is possible to simultaneously output two or more images obtained by performing different processes on one input image.

Furthermore, according to this embodiment, it is possible to output two or more images obtained by performing different processes on one input image, to the same display screen.

Furthermore, according to this embodiment, it is possible to output two or more images obtained by performing different processes on one input image, on the same display screen in PinP.

The software that realizes the image output apparatus 1 in this embodiment is the following sort of program. Specifically, this program is a program for causing a computer to function as: an input image accepting unit that accepts an input image; a first image acquiring unit that acquires a first image based on the input image; a second image acquiring unit that performs an image process that is different from the process that is performed by the first image acquiring unit, on the input image or the first image, thereby acquiring a second image; and an output unit that outputs the first image and the second image.

Embodiment 2

In this embodiment, an image output apparatus that acquires a second image in a region instructed by a user, and outputs a first image and one or at least two second images will be described. In this embodiment, a description of constituent elements denoted by the same reference numerals may be omitted.

In this embodiment, an image output apparatus that can simultaneously output a first image, and a second image at a partial spatial region instructed by a user and at a different time from the first image, will be described.

In this embodiment, an image output apparatus in which a position or a size of a display region of the second image is allowed to dynamically change, so that it is possible for a user to more easily view the first image or the second image will be described.

In this embodiment, an image output apparatus in which an image process when acquiring a second image changes in accordance with one or more feature values of an original image of a region including the second region will be described.

In this embodiment, an image output apparatus that allows a user to select an image process when acquiring a second image will be described.

In this embodiment, an image output apparatus that extracts a partial region of the first image, and acquires a second image will be described.

Furthermore, in this embodiment, an image output apparatus that stores and uses one or more parameters based on an instruction from a user, and acquires a second image will be described.

Figure 17:
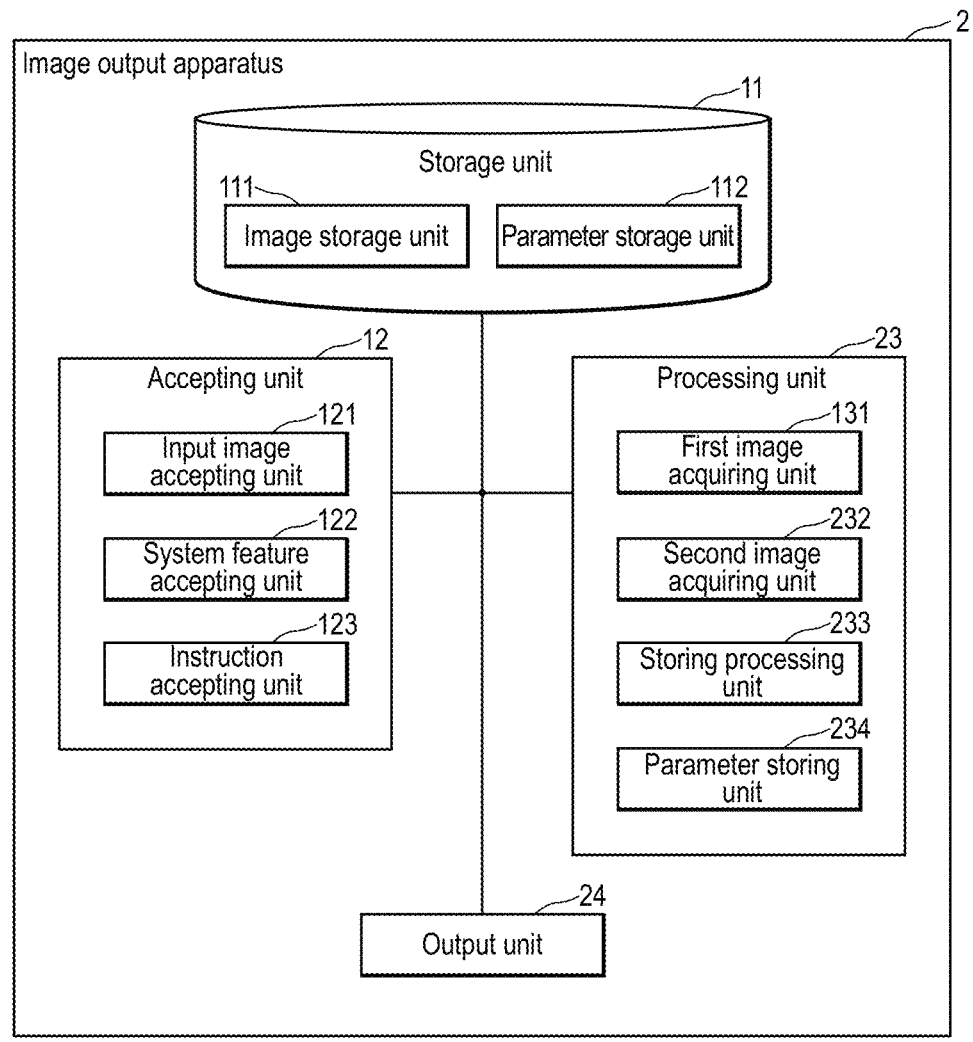
FIG. 17 is a block diagram of an image output apparatus 2 in Embodiment 2.

FIG. 17 is a block diagram of an image output apparatus 2 in this embodiment. The image output apparatus 2 is, for example, a video output apparatus such as a television receiver, a Blu-ray (registered trademark) recorder, or a DVD (registered trademark) recorder, a camera, a photo output apparatus, or the like, and there is no limitation on the apparatus as long as it can process images. Each image is typically a moving image (which may be referred to as video), but also may be a still image. Other information such as voice may be associated with an image. Other information may be contained in an image. It will be appreciated that there is no limitation on the data form, format, and the like of an image.

The image output apparatus 2 includes the storage unit 11, the accepting unit 12, a processing unit 23, and an output unit 24. The storage unit 11 includes an image storage unit 111 and a parameter storage unit 112.

The processing unit 23 includes the first image acquiring unit 131, a second image acquiring unit 232, a storing processing unit 233, and a parameter storing unit 234.

In the storage unit 11, various types of information can be stored. The various types of information are, for example, correspondence information, one or at least two images, one or at least two parameters, one or at least two image conversion operation expressions, one or at least two pieces of change information, or the like.

In the image storage unit 111, images can be stored. Each image is the whole of an input image, the whole of a first image, or the whole of a second image. Alternatively, the image is part of the input image, part of the first image, or part of the second image. In the image storage unit 111, two or more types of images among the above-described images may be stored.

In the parameter storage unit 112, one or more parameters can be stored. Each parameter is information that is used for a process that is performed by the first image acquiring unit 131 or the second image acquiring unit 232. The parameter is, for example, information indicating the level of brightening an image, information indicating the percentage of enlarging an image, information related to reproduction, information related to the hue of an image, a resolution appearance, or the like. The information related to reproduction is, for example, information indicating the time to extract an image that is used for reproduction, information indicating the reproduction speed, or the like.

The resolution appearance refers to fine appearance of an image, beautiful appearance of an image, high-quality appearance of an image, noiseless appearance of an image, or natural appearance of an image, or the like. The resolution appearance can be determined, for example, by performing frequency analysis. Specifically, for example, frequency analysis may be performed on an image or part of an image (a later-described spatio-temporal block, etc.), thereby determining that a resolution appearance is higher as a ratio of high-frequency components increases and a resolution appearance is lower as a ratio of low-frequency components increases. More specifically, the resolution appearance may be quantitatively determined (e.g., in five levels of 1 to 5) according to the ratio of high-frequency components at a first threshold or more. That is to say, it is determined that a resolution appearance is higher as a ratio of high-frequency components at a threshold or more increases. Also, frequency analysis may be performed, thereby acquiring a frequency distribution, and the resolution appearance may be quantitatively determined according to the frequency distribution. Also in this case, it is typically determined that a resolution appearance is higher as a ratio of high-frequency components increases and a resolution appearance is lower as a ratio of low-frequency components increases. Furthermore, the resolution appearance can be determined, for example, using an activity of pixel values in a space (referred to as a spatial activity). Specifically, for example, it may be determined that a resolution appearance is higher as a ratio of pixels having a spatial activity at a first threshold or more increases. Also, it may be determined that the resolution appearance may be quantitatively determined (e.g., in five levels of 1 to 5) according to the ratio of pixels with a spatial activity at a first threshold or more. Note that there is no limitation on a method for determining a resolution appearance or acquiring a resolution appearance.

The accepting unit 12 accepts various types of information, instructions, or the like. The various types of information, instructions, or the like is, for example, an input image, a system feature, optical signal information, one or more parameters, a user instruction, information on the storage unit 11, or the like.

The instruction accepting unit 123 accepts a user instruction, which is an instruction from a user. The user instruction is, for example, an instruction to perform an individual process, which is an optional process, a spatial region instruction that specifies a partial spatial region of the input image or the first image, a process selecting instruction that selects one or more individual processes from among the two or more individual processes, a reproduction method instruction, which is an instruction that specifies a reproduction method of the second image, a display region instruction, which is an instruction related to a display region for displaying the second image, or the like. The spatial region instruction is an instruction that specifies a partial spatial region of the input image or the first image, and may be an instruction that specifies two or more spatial regions. The reproduction method instruction is an instruction that specifies a reproduction method of the second image. The reproduction method instruction has, for example, an identifier for specifying a reproduction method. The reproduction method is, for example, delayed reproduction, repeated reproduction, slow reproduction, reverse reproduction, or the like. The display region instruction is an instruction that specifies a position of a display region for displaying the second image, and/or an instruction that specifies a size of the display region.

The processing unit 23 performs various processes. The various processes are, for example, processes that are performed by the first image acquiring unit 131, the second image acquiring unit 232, the storing processing unit 233, the parameter storing unit 234, and the like.

The processing unit 23 may automatically determine a position of a display region for displaying the second image and/or a size of the display region. For example, the processing unit 23 may detect an object (e.g., a person, an automobile, etc.) in the input image or the first image, and determine a position or a size of a display region at which the second image does not obstruct display of the object. For example, the processing unit 23 may recognize a background region in the input image or the first image, and determine a position or a size of a display region of the second image such that the second image is displayed in the background region. The processing unit 23 may determine a position or a size of a display region of the second image according to a display region instruction from a user.

The storing processing unit 233 stores the whole or part of the input image, the first image, or the second image, in the image storage unit 111.

If one or more parameters are accepted, the parameter storing unit 234 stores the one or more parameters in the parameter storage unit 112.

It may be considered that the second image acquiring unit 232 performs a process that is performed by the second image acquiring unit 132.

Furthermore, for example, if the instruction accepting unit 123 accepts a spatial region instruction, the second image acquiring unit 232 performs an image process that is different from the process that is performed by the first image acquiring unit 131, on an image of a spatial region specified by the spatial region instruction, thereby acquiring a second image. If the spatial region instruction is an instruction that specifies two or more regions, the second image acquiring unit 232 performs an image process that is different from the process that is performed by the first image acquiring unit 131, on images of the two or more regions, thereby acquiring two or more second images. The image process that is different from the process that is performed by the first image acquiring unit 131 is, for example, the above-described individual process. The individual process is, for example, a process that brightens an image that is to be processed, a process that darkens an image that is to be processed, a process that enlarges an image that is to be processed, a process that reduces an image that is to be processed, a process that increases the number of frames of an image that is to be processed, a process that reduces the number of frames of an image that is to be processed, a process that changes the color of an image that is to be processed, or the like. The image that is to be processed by the second image acquiring unit 232 is, for example, the input image or the first image.

The second image acquiring unit 232 performs, for example, an image process that is different from the process that is performed by the first image acquiring unit 131 on an image stored in the image storage unit 111, thereby acquiring a second image. The second image acquiring unit 232 extracts, for example, an image of a region specified by a spatial region instruction that is accepted by the instruction accepting unit 123, from an image stored in the image storage unit 111, thereby acquiring a second image. The first image that is output when the second image is output is an image at a different time. That is to say, the first image and the second image that are simultaneously output are at different times. More specifically, typically, the second image that is output is temporally delayed from the first image that is output simultaneously with the second image. Typically, after the input image is accepted, the first image is hardly delayed, but the second image is delayed.

The second image may be, for example, subjected by the output unit 24 to delayed reproduction, repeated reproduction, slow reproduction, reverse reproduction, pausing, or the like, compared with the first image. That is to say, for example, the second image may be an image buffered for the number of delayed frames or more, an imaged held only between the start frame and the end frame, or an image with some frames skipped. The second image acquiring unit 232 acquires, for example, the second image from an image stored in the image storage unit 111 such that reproduction according to the reproduction method instruction accepted by the instruction accepting unit 123 is performed. The pausing is outputting one frame of a moving image of the first image or the input image as a still image. It may be considered that the pausing is one mode of slow reproduction.

For example, the second image acquiring unit 232 preferably acquires one or more feature values of an image of a region containing a partial spatial region of the input image, the first image, or the second image, and performs different processes according to the one or more feature values, thereby acquiring a second image. The region containing a partial spatial region may be the whole of the input image, the first image, or the second image, a region including the partial spatial region and its peripheral regions, or a partial spatial region instructed by a user. Examples of the one or more feature values include a vicinity feature value, which is a feature value of part of one or more images, and a whole feature value, which is a feature value of the whole of one or more images. Examples of the vicinity feature value include a pixel value, an activity, a spatio-temporal correlation, a motion vector, and a frequency distribution. Furthermore, examples of the activity include a maximum value and a minimum value of multiple pixels, a dynamic range (DR), and a difference between multiple pixels. The difference between multiple pixels may be a difference between multiple pixels in a space, may be a difference between multiple pixels in the time direction, or may be a difference between multiple pixels in a space and in the time direction. Furthermore, examples of the whole feature value include a pixel value distribution in the whole of an image, a motion vector distribution in the whole of an image, a spatio-temporal correlation of the whole of one or at least two images, a noise amount of the whole of an image, an image format, information relating to edition of the whole of an image (whether or not PinP is selected, whether or not PoutP is selected, whether or not there is text superimposed on the image, etc.), content information relating to a content, which is one or more images, and a pattern detection result (face, etc.). Herein, the content information refers to, for example, the genres, the titles, and the names of people starring in programs listed in an electronic program guide (EPG). Note that the one or more feature values are also referred to as feature vectors as appropriate.

Specific examples in which, for example, the second image acquiring unit 232 acquires one or more feature values of an image of a region containing a partial spatial region of the input image, the first image, or the second image, and performs different processes according to the one or more feature values are (1) to (4) below.

(1) If an activity of an image of a region containing a partial spatial region of the second image is small enough to satisfy a predetermined condition, the second image acquiring unit 232 performs a process that improves the resolution appearance, on the second image. Furthermore, if an activity of an image of a region containing a partial spatial region of the first image is large enough to satisfy a predetermined condition, the second image acquiring unit 232 further performs a process that improves the resolution appearance, on the second image, in order to more emphasize the second image. Furthermore, the process that improves the resolution appearance is increasing parameter values of the process that improves the resolution appearance, performing the process that improves the resolution appearance multiple times, or the like. The state in which an activity is small enough to satisfy a predetermined condition is, for example, that an activity of an image is at a threshold or less, or less than a threshold, that a difference from an activity of an image of another spatial region is at a threshold or less, or less than a threshold, or the like. The state in which an activity is large enough to satisfy a predetermined condition is, for example, that an activity of an image is at a threshold or more, or more than a threshold, that a difference from an activity of an image of another spatial region is at a threshold or more, or more than a threshold, or the like.

(2) If pixel value distribution of an image of a region containing a partial spatial region of the second image is biased to the darker side enough to satisfy a predetermined condition, the second image acquiring unit 232 performs a process that improves the brightness, on the second image. Furthermore, if pixel value distribution of an image of a region containing a partial spatial region of the input image is biased to the darker side enough to satisfy a predetermined condition, the second image acquiring unit 232 suppresses the process that improves the brightness, on the second image, because the brightness of the second image does not have to be significantly improved. The suppressing a process that improves the brightness is decreasing parameter values of the process that improves the brightness, performing a process that lowers the brightness after a process that improves the brightness, or the like. The state in which pixel value distribution of an image of a region is biased to the darker side enough to satisfy a predetermined condition is, for example, that a value (e.g., an average value) calculated using the brightness of an image of a region as a parameter is at a threshold or less, or less than a threshold, that a difference between a value (e.g., an average value) calculated using the brightness of an image of another region as a parameter and a value (e.g., an average value) calculated using the brightness of an image of the region as a parameter is at a threshold or more, or more than a threshold, or the like.

(3) If a difference between multiple pixels in the time direction of an image of a region containing a partial spatial region of the second image is large enough to satisfy a predetermined condition, and motion vector distribution is biased to the larger side enough to satisfy a predetermined condition, the second image acquiring unit 232 performs slow reproduction on the second image. Furthermore, if a difference between multiple pixels of an image of a region containing a partial spatial region of the first image is large enough to satisfy a predetermined condition, and motion vector distribution is biased to the larger side enough to satisfy a predetermined condition, it is considered that the entire image is significantly moving, and thus, the speed of the slow reproduction is lowered in order to make the second image more viewable. The state in which a predetermined condition is satisfied is, for example, that a value is more than a threshold, or a threshold or more, or the like.

(4) It is also possible to combine two or more of (1) to (3) above. For example, in the case of combining (1) and (2), if an activity of an image of a region containing a partial spatial region of the second image is low enough to satisfy a predetermined condition, and pixel value distribution is biased to the darker side enough to satisfy a predetermined condition, the second image acquiring unit 232 performs a process that improves the resolution appearance and a process that improves the brightness, on the second image.

For example, if a user instruction that selects one or more individual processes from among the two or more individual processes is accepted, the second image acquiring unit 232 performs the selected one or more individual processes on an image of a partial spatial region of the input image or the first image, thereby acquiring a second image.

The second image acquiring unit 232 extracts, for example, an image of a partial spatial region from the first image, thereby acquiring a second image.

The second image acquiring unit 232 acquires, for example, a second image using one or more parameters in the parameter storage unit. For example, if a parameter is information for brightening a screen more than the first image, the second image acquiring unit 232 acquires a second image such that such that it is brighter than the first image according to the parameter.

For example, if the first image satisfies a predetermined condition, the second image acquiring unit 232 may acquire a second image. For example, upon detecting an object (e.g., a person, an automobile, a suspicious person, etc.) that satisfies a predetermined condition in the input image or the first image, the processing unit 23 automatically determines a region of the object. The second image acquiring unit 232 extracts, for example, an image of the region in the input image or the first image, thereby acquiring a second image. In this case, the second image is the above-described object. After extracting an image of the region in the input image or the first image, for example, the second image acquiring unit 232 may perform the above-described one or more individual processes, thereby acquiring a second image. In this case, for example, the individual processes are a noise removing process or a resolution creating process, or the like.

The output unit 24 outputs a first image and one or more second images. The output unit 24 may output two or more second images and a first image. The output unit 24 preferably outputs a first image and one or more second images to the same display screen. The output unit 24 outputs, for example, a first image and one or more second images, to the same display screen in PinP.

It is preferable that the output unit 24 simultaneously outputs a first image, and a second image acquired based on an input image corresponding to a time different from the first image. The input image corresponding to a time different from the first image may be an input image corresponding to a time different from an input image from which the first image was obtained. The image acquired based on an input image may be an image acquired based on a first image acquired based on an input image. The output unit 24 preferably performs reproduction of the second image according to the reproduction method instruction accepted by the instruction accepting unit 123. The output unit 24 may subject the second image to delayed reproduction, repeated reproduction, slow reproduction, reverse reproduction, or the like, compared with the first image.

For example, if the first image satisfies a predetermined condition, and the second image acquiring unit 232 acquires a second image, the output unit 24 may reduce the display region of the first image, and output the second image to a larger region. For example, the output unit 24 may output the first image to a half of the display screen, and output the second image to another half of the display screen. In particular, if the display region of the first image is reduced upon detecting a suspicious person, a person who is checking the display screen is likely to notice the appearance of the suspicious person. The techniques for recognizing an object and for recognizing a suspicious person in an image as described above are known techniques, and thus a detailed description thereof has been omitted.

The output is a concept that encompasses display on a display screen, projection using a projector, printing by a printer, output of a sound, transmission to an external apparatus, accumulation in a storage medium, delivery of a processing result to another processing apparatus or another program, and the like.

The storage unit 11, the image storage unit 111, and the parameter storage unit 112 are preferably non-volatile storage media, but may be realized also by volatile storage media.

There is no limitation on the procedure in which information is stored in the storage unit 11 and the like. For example, information may be stored in the storage unit 11 and the like via a storage medium, information transmitted via a communication line or the like may be stored in the storage unit 11 and the like, or information input via an input device may be stored in the storage unit 11 and the like.

The processing unit 23, the first image acquiring unit 131, the second image acquiring unit 232, the storing processing unit 233, and the parameter storing unit 234 may be realized typically by MPUs, memories, or the like. Typically, the processing procedure of the processing unit 23 and the like is realized by software, and the software is stored in a storage medium such as a ROM. Note that the processing procedure may be realized also by hardware (dedicated circuits).

The output unit 24 may be considered to include or not to include an output device, such as a display screen or a speaker. The output unit 14 may be realized, for example, by driver software for an output device, a combination of driver software for an output device and the output device, or the like.

Figure 18:
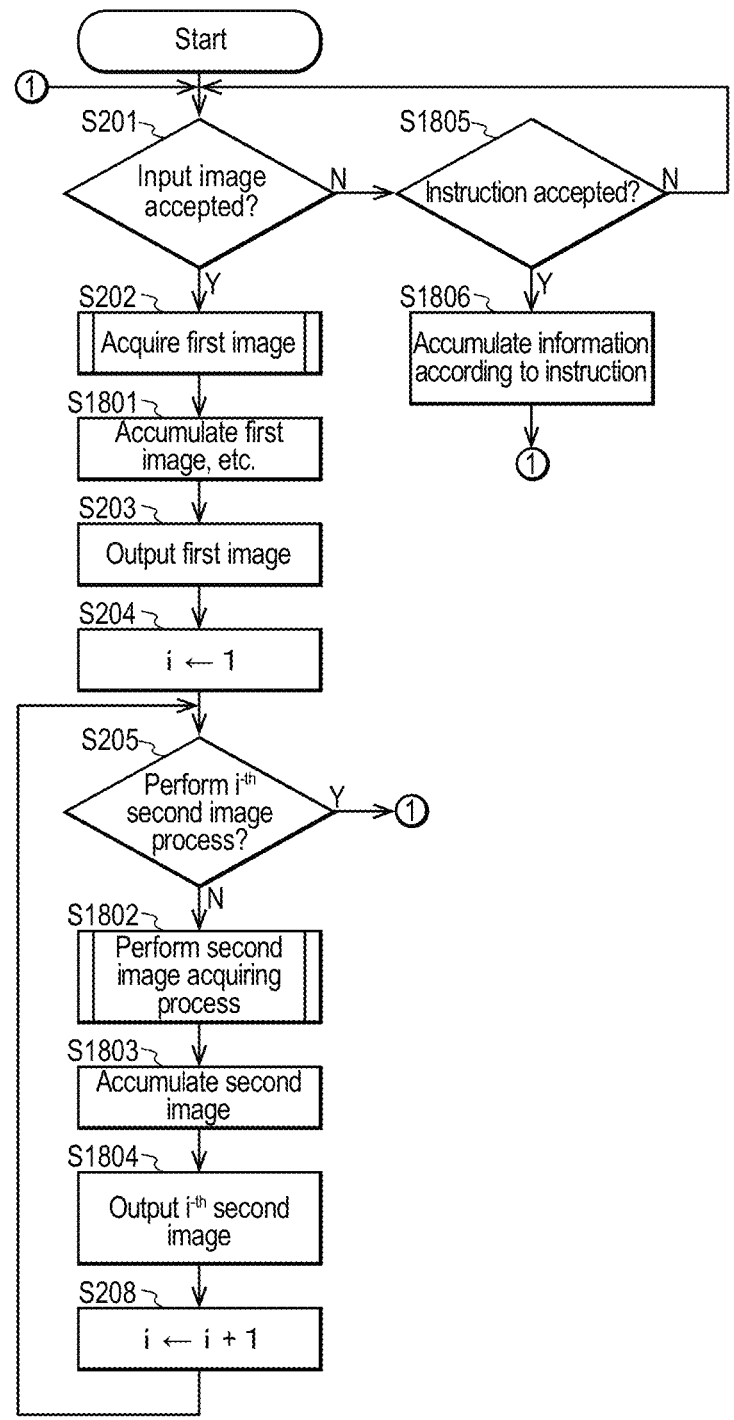
FIG. 18 is a flowchart illustrating an operation of the image output apparatus 2 in the embodiment.

Next, an operation of the image output apparatus 2 will be described with reference to the flowchart in FIG. 18. In the flowchart in FIG. 18, a description of the same steps as those in the flowchart in FIG. 2 will be omitted.

(Step S1801) The storing processing unit 233 accumulates the first image or the like in the image storage unit 111. The first image or the like is one or more types of images among the first image, the input image, and the second image. This process does not necessarily have to be performed.

(Step S1802) The second image acquiring unit 232 performs a second image acquiring process. The second image acquiring process will be described with reference to the flowchart in FIG. 19.

(Step S1803) The storing processing unit 233 accumulates the second image in the image storage unit 111. This process does not necessarily have to be performed.

(Step S1804) The output unit 24 outputs the second image acquired in step S1802. The output unit 24 preferably outputs a first image and one or more second images to the same display screen. Information indicating an output destination (e.g., an IP address or a MAC address of a display screen to which the image is to be output, etc.) and information indicating an output mode (e.g., a position or a size of a window to which the second image is to be output, etc.) of the second image are stored in the storage unit 11. The output unit 24 reads the information indicating an output destination and the information indicating an output mode, and outputs the second image according to the information. Information indicating an output destination and information indicating an output mode of each $i^{-th}$ second image may be stored in association with information for identifying the second image acquiring unit 232, may be stored in association with an individual process instruction corresponding to the $i^{-th}$ second image process, or may be stored in association with an $i^{-th}$ group of one or more parameters or the like.

(Step S1805) The instruction accepting unit 123 determines whether or not a user instruction has been accepted. If a user instruction has been accepted, the procedure advances to step S1806, and, if not, the procedure returns to step S201.

(Step S1806) The processing unit 13 accumulates information according to the instruction accepted in step S1805, in the storage unit 11. The processing unit 13 accumulates information for identifying a process in the case in which the user instruction is an instruction to perform an individual process, accumulates information for specifying a spatial region (e.g., two coordinate values indicating a rectangular) in the case in which the user instruction is a spatial region instruction, accumulates information for identifying a process in the case in which the user instruction is a process selecting instruction, accumulates information for identifying a reproduction method in the case in which the user instruction is a reproduction method instruction, and accumulates information for specifying a display region (e.g., two coordinate values indicating a rectangular) in the case in which the user instruction is a display region instruction.

Figure 19:
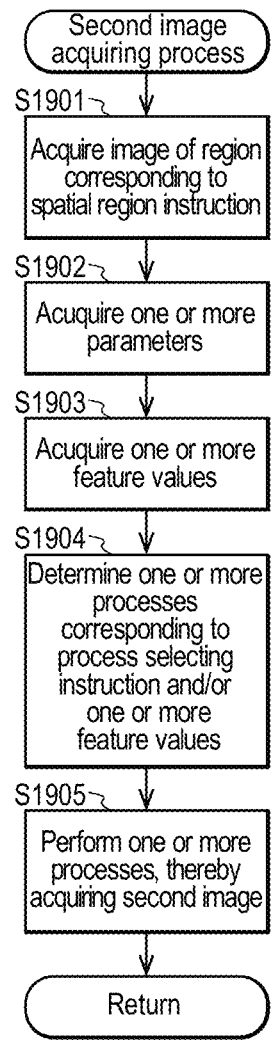
FIG. 19 is a flowchart illustrating a second image acquiring process in the embodiment.

Next, the second image acquiring process in step S1802 will be described with reference to the flowchart in FIG. 19.

(Step S1901) The second image acquiring unit 232 acquires an image of a region corresponding to a spatial region instruction, from the image in the image storage unit 111, the input image, or the first image.

(Step S1902) The second image acquiring unit 232 acquires one or more parameters from the storage unit 11.

(Step S1903) The second image acquiring unit 232 acquires one or more feature values of an image of a region containing a partial spatial region of the input image, the first image, or the second image.

(Step S1904) The second image acquiring unit 232 determines one or more processes corresponding to one or more process identifiers stored in the storage unit 11 (identifiers of processes corresponding to a process selecting instruction) and/or one or more feature values. The determining a process is typically acquiring an identifier of the process (e.g., an address for specifying a function name, a method name, or a process, etc.).

(Step S1905) The second image acquiring unit 232 performs the one or more processes determined in step S1904, on the image acquired in step S1901, thereby acquiring a second image.

Hereinafter, two specific operations of the image output apparatus 2 in this embodiment will be described. Specific Example 1 shows a case in which a user can simultaneously compare optimal views, for a specific region in a screen. Specific Example 2 shows a case in which a user can compare optimal views at different times, for a specific region in a screen.

Specific Example 1

It is assumed that a user is watching video of Mount Fuji on a video display apparatus. It is assumed that the user has input a spatial region instruction that designates a portion that the user wants to watch in Mount Fuji and a parameter (information indicating the level of brightening an image) to the image output apparatus 2. The accepting unit 12 accepts the spatial region instruction and the parameter, and accepts information (x1,y1) (x2,y2) for specifying a spatial region and brightness (M). The processing unit 13 accumulates the information (x1,y1) (x2,y2) for specifying a spatial region and the brightness (M) in the storage unit 11.

Next, the input image accepting unit 121 accepts the video of Mount Fuji. The first image acquiring unit 131 performs a first image process on the accepted video, thereby acquiring a first image. The first image process is, for example, a noise removing process, or the like.

Next, the second image acquiring unit 232 extracts an image of a designated region from the input image or the first image according to the information (x1,y1) (x2,y2) for specifying a spatial region, and brightens the extracted image according to the parameter, thereby acquiring a second image.

Next, the processing unit 23 determines a position at which viewing of the partial image of the spatial region of the first image is not obstructed to the extent possible, using the information (x1,y1) (x2,y2) for specifying the spatial region. It is preferable that the position is typically any one of the upper left corner, the upper right corner, the lower left corner, and the lower right corner of the rectangular screen. In this example, it is determined that the position at which viewing is not obstructed is the lower left corner.

Figure 20:
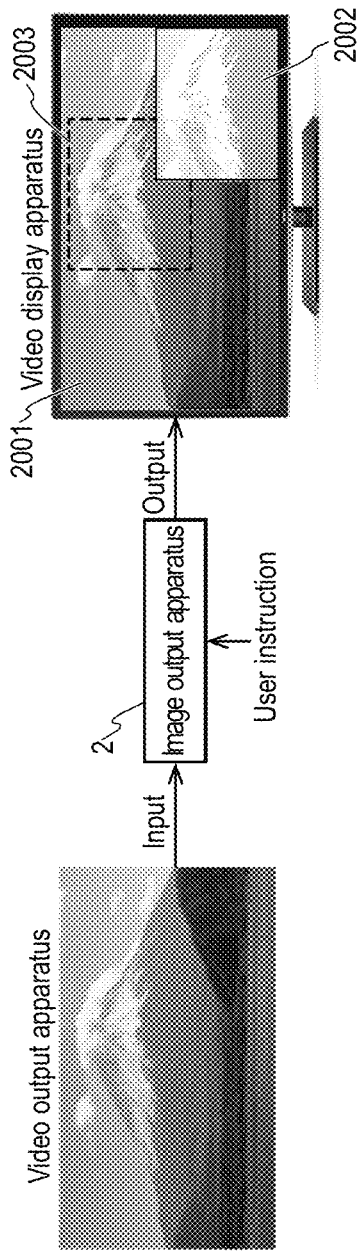
FIG. 20 is a diagram showing an output example in the embodiment.

Next, the output unit 24 outputs the acquired second image to the lower left corner of the screen. FIG. 20 shows this situation. In FIG. 20, the image output apparatus 2 that has received the video output by a video output apparatus (e.g., a broadcasting apparatus or an image reproducing apparatus) outputs a first image (2001) showing the entire Mount Fuji and a second image (2002) of a region about the summit of Mount Fuji in a superimposed manner such that the images can be compared with each other.

Furthermore, it is assumed that the user sequentially inputs different parameters (e.g., information indicating the level of darkening an image, the percentage of enlarging an image, the percentage of reducing an image, information indicating the level of increasing the number of frames, information indicating the level of decreasing the number of frames, color change, etc.).

Then, through the above-described process, the image output apparatus 2 outputs a second image according to the parameters input from the user, to the region 2002 in FIG. 20.

Accordingly, the user can determine optimal views of this video with various trials. The spatial region instruction instructed by a user is the region 2003 in FIG. 20.

Specific Example 2

It is assumed that a user is watching video of a race on a video display apparatus. It is assumed that the user has input information (x3,y3) (x4,y4) for specifying a spatial region that the user wants to watch in the video, and a reproduction method instruction "an instruction to delay a designated region by N frames, and to reproduce the region in an enlarged manner", which is an instruction that specifies a reproduction method, to the image output apparatus 2. The processing unit 13 accumulates the information (x3,y3) (x4,y4) for specifying a spatial region and a reproduction method identifier for identifying the reproduction method, in the storage unit 11.

Next, the input image accepting unit 121 accepts the video of the race. The first image acquiring unit 131 performs a first image process on the accepted video, thereby acquiring a first image. The storing processing unit 233 accumulates the first image or the input image in the image storage unit 111.

Next, the second image acquiring unit 232 extracts an image of a spatial region specified by (x3,y3) (x4,y4), from an image located N frames before and accumulated in the image storage unit 111, thereby acquiring a second image. The storing processing unit 233 accumulates the second image in the image storage unit 111.

Next, the processing unit 23 determines a position at which viewing of the partial image of the spatial region of the first image is not obstructed to the extent possible, using the information (x3,y3) (x4,y4) for specifying the spatial region. In this example, it is determined that the position at which viewing is not obstructed is the lower left corner.

Figure 21:
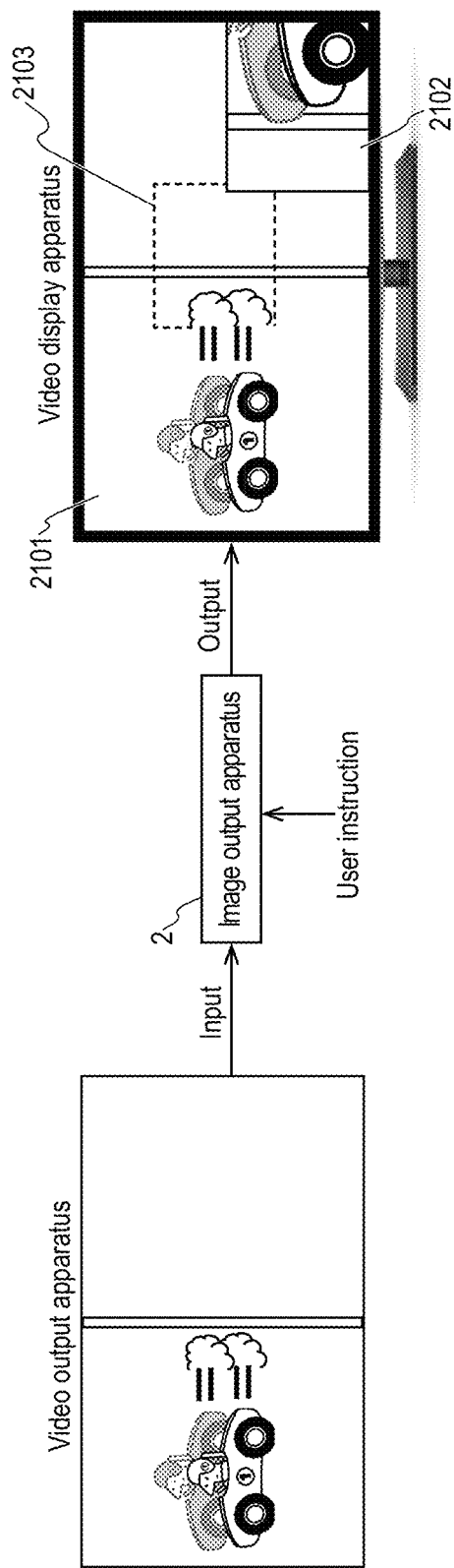
FIG. 21 is a diagram showing an output example in the embodiment.

Next, the output unit 24 outputs the acquired second image to the lower left corner of the video display apparatus. The video display apparatus displays video as shown in FIG. 21. In FIG. 21, the image output apparatus 2 that has received the video output by a video output apparatus (e.g., a broadcasting apparatus or an image reproducing apparatus) outputs a first image (2101) of the entire race, and a second image (2102) of a region about the head portion of an automobile that the user especially wants to watch, at a delayed time, in a superimposed manner such that the images can be compared with each other.

Furthermore, it is assumed that the user sequentially inputs different parameters (e.g., information indicating the level of darkening an image, the percentage of enlarging an image, the percentage of reducing an image, information indicating the level of increasing the number of frames, information indicating the level of decreasing the number of frames, color change, etc.) and a reproduction method instruction.

Then, as in the above-described process, the image output apparatus 2 outputs a second image according to the parameters and the reproduction method instruction input from the user, to the region 2102 in FIG. 21.

Accordingly, the user can determine optimal views of this video with various trials at different times. The spatial region instruction instructed by a user is the region 2103 in FIG. 21.

In the above-described specific examples, the first image acquiring unit 131 may acquire the input image as a first image without performing any process. In the above-described specific examples, the first image acquiring unit 131 may acquire a first image by performing only the generic process on the input image.

As described above, according to this embodiment, it is possible to simultaneously output a first image, and a second image of a partial spatial region instructed by a user.

Furthermore, according to this embodiment, it is possible to simultaneously output a first image, and two or more second images of two or more partial spatial regions instructed by a user.

Furthermore, according to this embodiment, it is possible to simultaneously output a first image, and a second image at a partial spatial region instructed by a user and at a different time from the first image.

Furthermore, according to this embodiment, a position or a size of a display region of the second image is allowed to dynamically change, so that it is possible for a user to more easily view the first image or the second image.

Furthermore, according to this embodiment, it is possible to properly and simultaneously output a first image, and a second image of a partial spatial region instructed by a user.

Furthermore, according to this embodiment, it is possible to simultaneously output a first image, and a second image of a partial spatial region instructed by a user, the second image being desired by a user.

Furthermore, according to this embodiment, it is possible to store a parameter based on an instruction from a user, and to simultaneously output a second image and a first image acquired using the parameter.

The software that realizes the image output apparatus 2 in this embodiment is the following sort of program. Specifically, this program is preferably a program for causing a computer to function, for example, as: an input image accepting unit that accepts an input image; a first image acquiring unit that acquires a first image based on the input image; a second image acquiring unit that performs an image process that is different from the process that is performed by the first image acquiring unit, on the input image or the first image, thereby acquiring a second image; and an output unit that outputs the first image and the second image.

Embodiment 3

In this embodiment, a video signal processing apparatus that performs a process using a generic processing unit and a process using an individual processing unit on an input image, thereby acquiring an output image, and outputs the image will be described.

Figure 22:
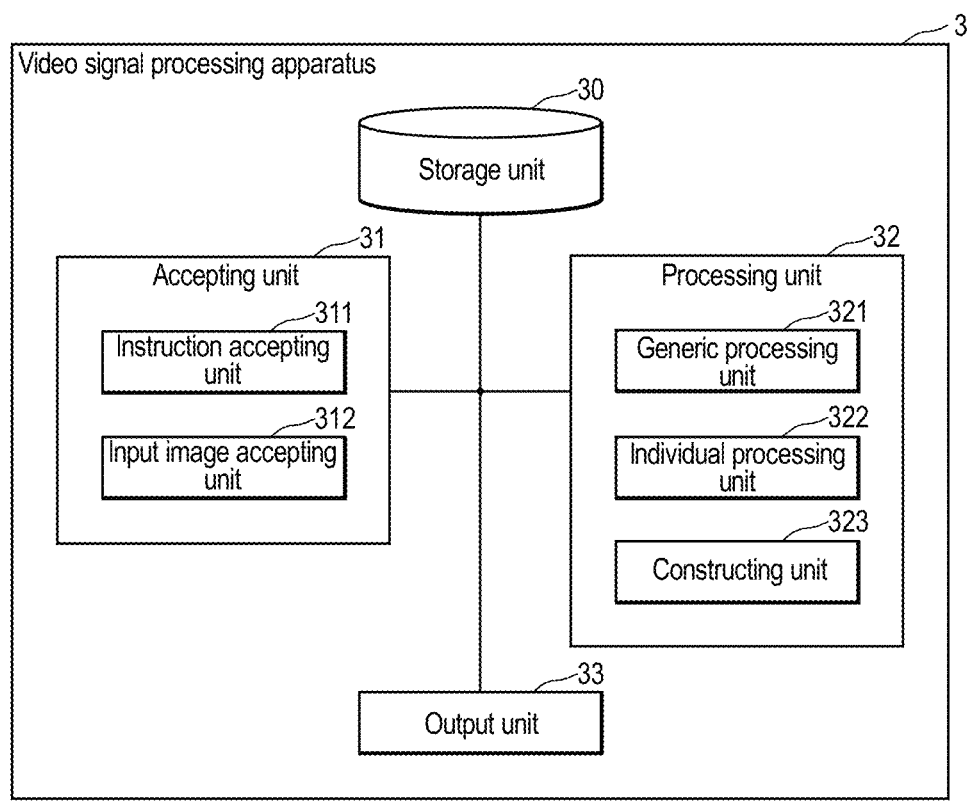
FIG. 22 is a block diagram of a video signal processing apparatus 3 in Embodiment 3.

FIG. 22 is a block diagram of a video signal processing apparatus 3 in this embodiment.

A video signal processing apparatus 3 includes a storage unit 30, an accepting unit 31, a processing unit 32, and an output unit 33.

The accepting unit 31 includes an instruction accepting unit 311 and an input image accepting unit 312.

The processing unit 32 includes a generic processing unit 321, an individual processing unit 322, and a constructing unit 323.

In the storage unit 30, various types of information can be stored. The various types of information are, for example, one or at least two look-up tables (hereinafter, also referred to as "LUTs" as appropriate). The various types of information are, for example, one or at least two pieces of change information, one or at least two image conversion operation expressions.

Each LUT has one or at least two correspondence records. Each correspondence record is information for identifying correspondence between one or at least two input images and one or at least two output images. In the storage unit 30, two or more LUTs may be stored in association with one or at least two system features. The information for identifying correspondence between input images and output images is information for identifying correspondence between the whole or part of input images and the whole or part of output images. If the number of correspondence records contained in the LUT is one, the correspondence record is, for example, an operation expression for converting an image, or one or more parameter groups that are to be given to an operation expression for converting an image. Examples of the parameter include a coefficient of a multiply-accumulate operation, a level for changing a difference or a ratio between brightness and darkness, a determination parameter, and the like. The determination parameter is a threshold that is used for determination, and examples thereof include a threshold for a pixel value or the like for determining whether light is mirror-reflected or diffuse-reflected, a threshold for a pixel value or the like for determining whether light is direct light or diffused light, and the like.

The image conversion operation expression is an operation expression for performing image conversion. The operation expression is, for example, a multiply-accumulate operation related to a tap arranged in spacetime. Examples of the parameter include coefficients of a multiply-accumulate operation, determination parameters for determining system features, and the like.

The change information is information for changing an input image. The change information is, for example, information for changing a parameter of an image conversion operation expression. The information for changing a parameter of an image conversion operation expression is, for example, a group of parameters of the image conversion operation expression. The information for changing a parameter of an image conversion operation expression is, for example, an operation expression for determining a coefficient of a multiply-accumulate operation according to a system feature.

In the storage unit 30, one or more pieces of change information may be stored in association with one or at least two system features. In the storage unit 30, one or more image conversion operation expressions may be stored in association with one or at least two system features.

The change information may be information for changing a spatio-temporal tap arrangement. The information for changing a spatio-temporal tap arrangement is, for example, information indicating which pixel is to be used for processing, among a pixel of interest and pixels in the vicinity thereof in an input image. In the storage unit 30, one or at least two pieces of change information for changing a spatio-temporal tap arrangement may be stored in association with one or at least two system features.

The accepting unit 31 accepts various types of information. The various types of information are, for example, an input image, or a user instruction. The accepting is, for example, receiving information transmitted via a wired or wireless communication line. The accepting is, for example, a concept that encompasses accepting information read from a storage medium such as an optical disk, a magnetic disk, or a semiconductor memory, accepting information input from an input device such as a keyboard, a mouse, or a touch panel, and the like.

The information may be input through any part such as a keyboard, a mouse, a menu screen, or the like. The accepting unit 31 may be realized by a device driver for an input part such as a keyboard, or control software for a menu screen, for example.

The instruction accepting unit 311 accepts a user instruction. The user instruction is an instruction from a user, and is, for example, an instruction as to whether or not to perform an individual process. The individual process is an optional process. The individual process is typically an optional image process. The instruction to perform an individual process is referred to as an individual process instruction. The individual process instruction is, for example, a flag indicating to perform an individual process. The individual process instruction is, for example, a parameter that is used for an individual process. The individual process instruction is, for example, a coefficient for an individual process that is used by the constructing unit 323 to composite an output image.

There is no limitation on the time when the instruction accepting unit 311 accepts an individual process instruction. Typically, the instruction accepting unit 311 accepts an individual process instruction before the input image accepting unit 312 accepts an input image. Note that an individual process instruction may be accepted after the input image accepting unit 312 accepts an input image and before a process on the input image is started.

The accepting is a concept that encompasses accepting information input from an input device such as a keyboard, a mouse, or a touch panel, receiving information transmitted via a wired or wireless communication line, accepting information read from a storage medium such as an optical disk, a magnetic disk, or a semiconductor memory, and the like.

The user instruction may be input through any part such as a keyboard, a mouse, a menu screen, or the like. The instruction accepting unit 311 may be realized by a device driver for an input part such as a keyboard, or control software for a menu screen, for example.

The input image accepting unit 312 accepts an input image. The input image is an image. It will be appreciated that the input image may be video, that is, the input image accepting unit 312 may accept video, which is two or more input images. The input image is typically an image that is accepted by the video signal processing apparatus 3 from the outside. The input image that is accepted by the input image accepting unit 312 is typically two or more input images (which may be referred to as frames or fields), but also may be one input image (which may be referred to as a frame or a field). The multiple frames or fields that are accepted may be simply referred to as input images.

Furthermore, the accepting is typically receiving information transmitted via a wired or wireless communication line. The accepting is, for example, a concept that encompasses accepting information read from a storage medium such as an optical disk, a magnetic disk, or a semiconductor memory, accepting information input from an input device such as a keyboard, a mouse, or a touch panel, and the like.

The input image accepting unit 312 may be realized by a wired or wireless communication part, broadcasting part, or the like.

The processing unit 32 performs various processes. The various processes are, for example, processes that are performed by the generic processing unit 321, the individual processing unit 322, the constructing unit 323, and the like.

The generic processing unit 321 performs a generic process on the input image, thereby acquiring first processing information. The generic process is an essential process that is performed on the input image. It will be appreciated that the generic process is a process that has to be performed regardless of user's preference. The generic process is, for example, a conversion process of the number of pixels in the case in which the input image and the output image have different formats. The generic process is, for example, a distortion removing process on the input image. The first processing information is typically an image. It will be appreciated that the generic process may include two or more processes.

The individual processing unit 322 performs an individual process on the input image, thereby acquiring second processing information. The individual process is an optional process that is performed on the input image. The individual process is, for example, a process that changes the appearance of the output image. The process that changes the appearance of the output image is, for example, a process that changes the brightness of the output image according to natural laws, or changes the output magnification of the output image as in the case of viewing an object from a position closer to or away from that object. The process that changes the brightness of the output image according to natural laws is more specifically a process that changes the brightness of an output image while applying constraints such that light emitted from the image does not behave in a very unnatural manner as light in nature. The behaving in a very unnatural manner as light in nature is, for example, the intensity of light that is very unnatural as light in nature, the amount of change in the intensity of light that is very unnatural as light in nature, or the like.

Furthermore, it is preferable that a user instructs a parameter that is used for a process, as an individual process instruction, for the individual process. The parameter that is used for a process is, for example, the level of changing brightness or the level of changing magnification of the output.

If the instruction accepting unit 311 accepts an individual process instruction, the individual processing unit 322 performs an individual process on the input image, thereby acquiring second processing information. If the individual process instruction is a parameter that is used for a process, the individual processing unit 322 performs an individual process using the parameter, thereby acquiring second processing information. The second processing information is typically an image. It will be appreciated that the individual process may include two or more processes. If the instruction accepting unit 311 accepts an individual process instruction, the constructing unit 323 constructs an output image using the first processing information and the second processing information. The constructing unit 323 may composite the first processing information and the second processing information, thereby constructing an output image. The compositing is, for example, compositing images. The compositing the first processing information and the second processing information is, for example, adding pixel values of an image of the first processing information and an image of the second processing information. The compositing the first processing information and the second processing information is, for example, linear combination of pixel values of an image of the first processing information and an image of the second processing information. In this case, it is preferable that a user instructs a coefficient of the linear combination. If the instruction accepting unit 311 does not accept an individual process instruction, the constructing unit 323 may acquire an output image using the first processing information.

If the instruction accepting unit 311 accepts an individual process instruction, the output unit 33 outputs the output image constructed by the constructing unit 323. If the instruction accepting unit 311 does not accept an individual process instruction, the output unit 33 outputs the output image acquired using the first processing information. The output image acquired using the first processing information may be the first processing information, or may be an image obtained by performing a predetermined process on the first processing information. The predetermined process may be performed on the first processing information by the constructing unit 323. There is no limitation on the predetermined process.

The output image that is output by the output unit 33 is typically two or more output images (which may be referred to as frames or fields), but also may be one output image (which may be referred to as a frame or a field). The multiple frames or fields that are output may be simply referred to as output images.

The output is typically a concept that encompasses display on a display screen, projection using a projector, printing by a printer, output of a sound, transmission to an external apparatus, accumulation in a storage medium, delivery of a processing result to another processing apparatus or another program, and the like.

The processing unit 32, the generic processing unit 321, the individual processing unit 322, and the constructing unit 323 may be realized typically by MPUs, memories, or the like. Typically, the processing procedure of the processing unit 32 and the like is realized by software, and the software is stored in a storage medium such as a ROM. Note that the processing procedure may be realized also by hardware (dedicated circuits).

The output unit 33 may be considered to include or not to include an output device, such as a display screen. The output unit 33 may be realized, for example, by driver software for an output device, a combination of driver software for an output device and the output device, or the like.

Next, an operation of the video signal processing apparatus 3 will be described with reference to the flowchart in FIG. 23.

(Step S2301) The input image accepting unit 312 determines whether or not an input image has been accepted. If an input image has been accepted, the procedure advances to step S2302, and, if not, the procedure advances to step S2307.

(Step S2302) The generic processing unit 321 performs a generic process on the input image accepted in step S2301, thereby acquiring first processing information.

(Step S2303) The individual processing unit 322 determines whether or not an individual process instruction is stored in the storage unit 30. If an individual process instruction is stored, the procedure advances to step S2304, and, if not, the procedure advances to step S2305.

(Step S2304) The individual processing unit 322 performs an individual process on the input image accepted in step S2301, thereby acquiring second processing information.

(Step S2305) If an individual process instruction is stored in the storage unit 30, the constructing unit 323 constructs an output image using the first processing information acquired in step S2302 and the second processing information acquired in step S2304. If an individual process instruction is not stored in the storage unit 30, the constructing unit 323 acquires an output image using the first processing information acquired in step S2302.

(Step S2306) The output unit 33 outputs the output image acquired in step S2305. The procedure returns to step S2301.

(Step S2307) The instruction accepting unit 311 determines whether or not an individual process instruction from a user has been accepted. If an individual process instruction has been accepted, the procedure advances to step S2308, and, if not, the procedure returns to step S2301.

(Step S2308) The processing unit 32 accumulates the individual process instruction accepted in step S2307, in the storage unit 30. The procedure returns to step S2301.

Figure 23:
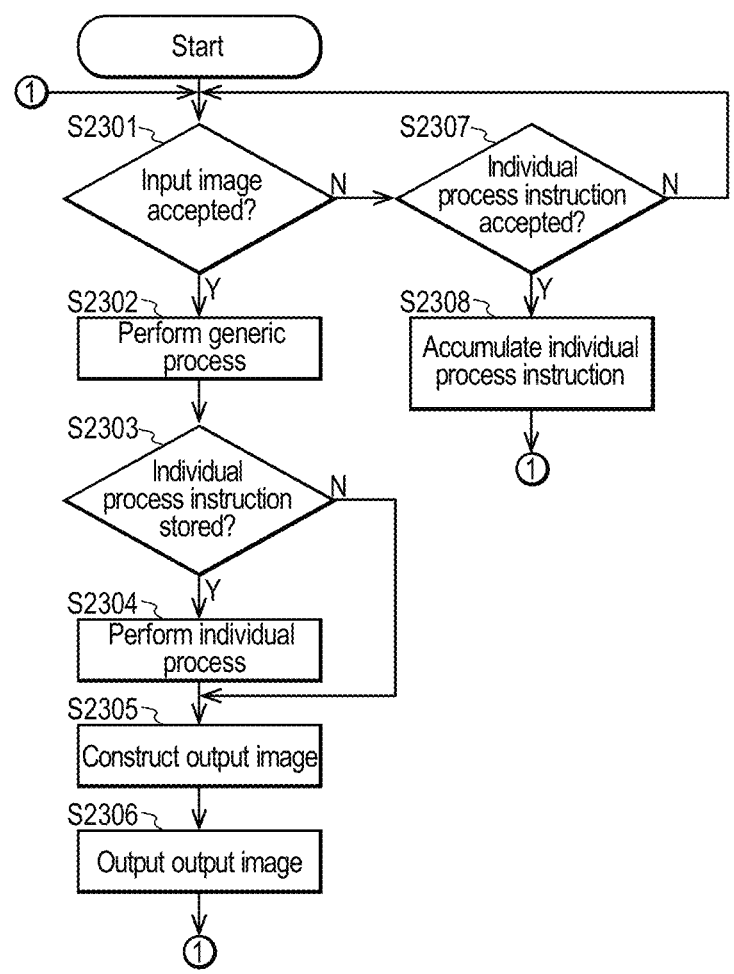
FIG. 23 is a flowchart illustrating an operation of the video signal processing apparatus 3 in the embodiment.

Note that the procedure is terminated by powering off or an interruption at the end of the process in the flowchart in FIG. 23.

Furthermore, in the flowchart in FIG. 23, it is preferable that an individual process instruction can be accepted in step S2307 even while an input image is being accepted in step S2301. That is to say, it is preferable that a user can change an individual process instruction while viewing an output image. It is preferable that accepting an input image in step S2301 and accepting an individual process instruction in step S2307 can be performed in parallel.

Figure 24:
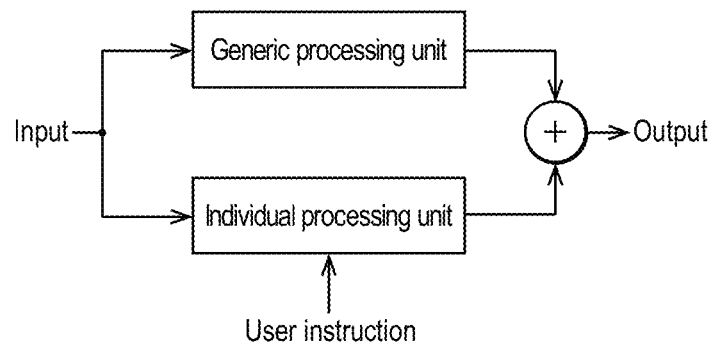
FIG. 24 is a diagram showing a concept of an operation of the video signal processing apparatus 3 in the embodiment.

Furthermore, FIG. 24 shows a processing concept of the flowchart in FIG. 23. FIG. 24 shows that the video signal processing apparatus 3 integrates input (an input image) with first processing information, which is a processing result of the generic processing unit 321, and second processing information, which is a processing result of the individual processing unit 322, thereby obtaining an output image as output. The video signal processing apparatus 3 shows that whether or not the individual processing unit 322 operates is changed by a user instruction. The integrating first processing information and second processing information is, for example, adding pixel values of an image of the first processing information and an image of the second processing information. The integrating first processing information and second processing information is, for example, a process that acquires representative values (e.g., average values, or weighted average values, etc.) of one or more feature values of the first processing information that is an image and one or more feature values of the second processing information that is an image, and constructs an output image using the one or more representative values. Examples of the one or more feature values include a vicinity feature value, which is a feature value of part of one or more images, and a whole feature value, which is a feature value of the whole of one or more images. Examples of the vicinity feature value include a pixel value, an activity, a spatio-temporal correlation, a motion vector, and a frequency distribution. Furthermore, examples of the activity include a maximum value and a minimum value of multiple pixels, a dynamic range (DR), and a difference between multiple pixels. The difference between multiple pixels may be a difference between multiple pixels in a space, may be a difference between multiple pixels in the time direction, or may be a difference between multiple pixels in a space and in the time direction. Furthermore, examples of the whole feature value include a pixel value distribution in the whole of an image, a motion vector distribution in the whole of an image, a spatio-temporal correlation of the whole of one or at least two images, a noise amount of the whole of an image, an image format, information relating to edition of the whole of an image (whether or not PinP is selected, whether or not PoutP is selected, whether or not there is text superimposed on the image, etc.), content information relating to a content, which is one or more images, and a pattern detection result (face, etc.). Herein, the content information refers to, for example, the genres, the titles, and the names of people starring in programs listed in an electronic program guide (EPG). Note that the one or more feature values are also referred to as feature vectors as appropriate.

As described above, according to this embodiment, it is possible to customize an image process according to user's preference, and to output an image desired by a user.

The processing in this embodiment may be realized by software. The software may be distributed by software downloads or the like. Furthermore, the software may be distributed in a form where the software is stored in a storage medium such as a CD-ROM. Note that the same is applied to other embodiments described in this specification. The software that realizes the video signal processing apparatus in this embodiment is the following sort of program. Specifically, this program is a program for causing a computer to function, for example, as: an input image accepting unit that accepts an input image; an instruction accepting unit that accepts a user instruction as to whether or not to perform an individual process, which is an optional process; a generic processing unit that performs a generic process, which is an essential process, on the input image, thereby acquiring first processing information; an individual processing unit that, in a case in which the user instruction is an individual process instruction, which is an instruction to perform an individual process, performs an individual process on the input image, thereby acquiring second processing information; a constructing unit that, in a case in which the instruction accepting unit accepts an individual process instruction, constructs an output image using the first processing information and the second processing information; and an output unit that outputs the output image constructed by the constructing unit in a case in which the instruction accepting unit accepts an individual process instruction, and outputs the output image acquired using the first processing information in a case in which the instruction accepting unit does not accept an individual process instruction.

Embodiment 4

This embodiment is different from Embodiment 3 in that there are two or more individual processing units.

In this embodiment, a video signal processing apparatus that performs a process using a generic processing unit and a process using any one or more of two or more individual processing units on the input image, thereby acquiring an output image, and outputs the image will be described.

Figure 25:
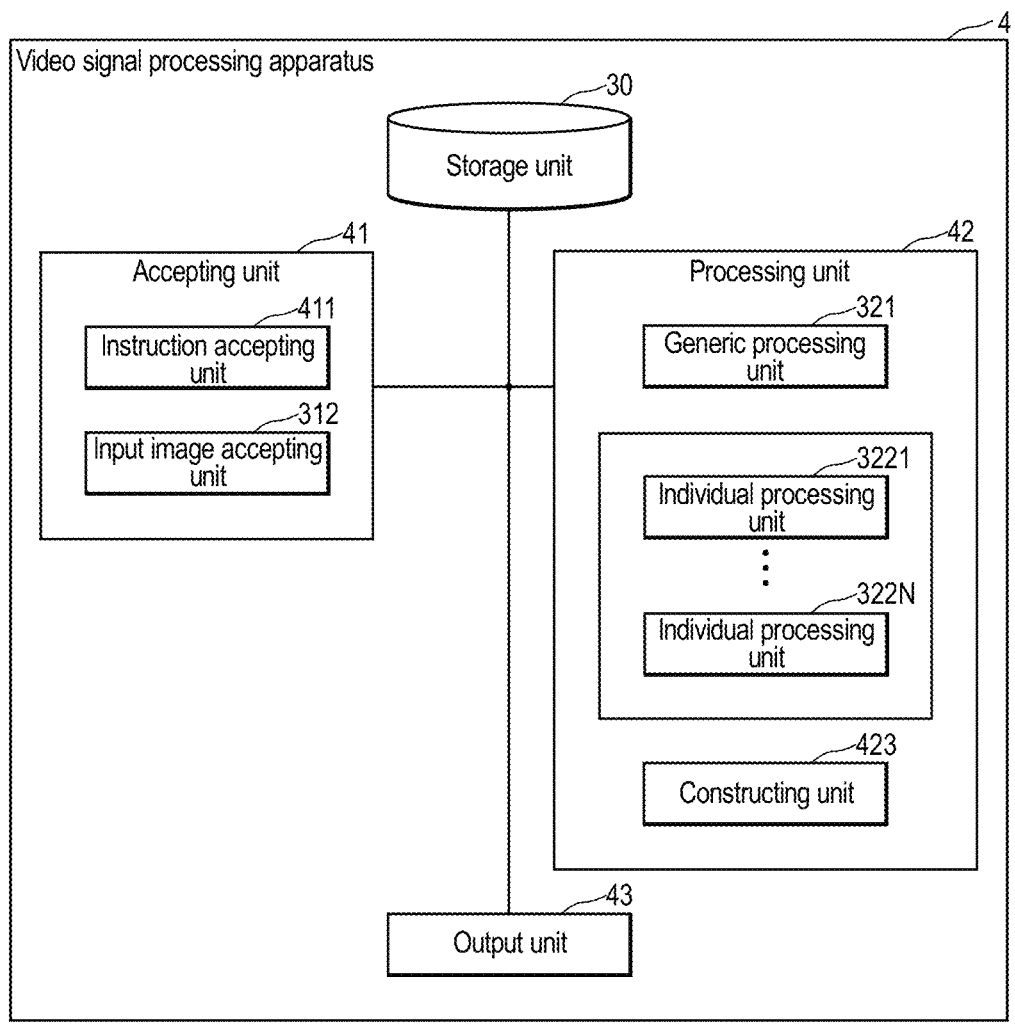
FIG. 25 is a block diagram of a video signal processing apparatus 4 in Embodiment 4.

FIG. 25 is a block diagram of a video signal processing apparatus 4 in this embodiment.

The video signal processing apparatus 4 includes the storage unit 30, an accepting unit 41, a processing unit 42, and an output unit 43.

The accepting unit 41 includes an instruction accepting unit 411 and the input image accepting unit 312.

The processing unit 42 includes the generic processing unit 321, two or more individual processing units, and a constructing unit 423. It is assumed that the two or more individual processing units are an individual processing unit 3221, an individual processing unit 3222, . . . , and an individual processing unit 322N (N is a natural number of two or more).

The accepting unit 41 accepts various types of information. The various types of information are, for example, an input image, or a user instruction.

The instruction accepting unit 411 accepts a user instruction. The user instruction is an instruction from a user, and is, for example, an instruction to perform an individual process, or an instruction not to perform an individual process.

The instruction accepting unit 411 accepts a user instruction as to whether or not to perform an individual process corresponding to each of the two or more individual processing units. The instruction accepting unit 411 preferably accepts at least one individual process instruction. The one individual process instruction corresponds to one individual processing unit. The individual process instruction typically has an individual process identifier for identifying an individual processing unit or an individual process.

The accepting is a concept that encompasses accepting information input from an input device such as a keyboard, a mouse, or a touch panel, receiving information transmitted via a wired or wireless communication line, accepting information read from a storage medium such as an optical disk, a magnetic disk, or a semiconductor memory, and the like.

The user instruction may be input through any part such as a keyboard, a mouse, a menu screen, or the like. The instruction accepting unit 411 may be realized by a device driver for an input part such as a keyboard, or control software for a menu screen, for example.

The processing unit 42 performs various processes. The various processes are, for example, processes that are performed by the generic processing unit 321, the individual processing unit 322, the constructing unit 423, and the like.

If the user instruction is an individual process instruction, the individual processing unit 3221, the individual processing unit 3222, . . . , and the individual processing unit 322N perform an individual process on the input image, thereby acquiring second processing information. The individual process that is performed by each of the individual processing unit 3221, the individual processing unit 3222, . . . , and the individual processing unit 322N is, for example, the individual process described in Embodiment 3.

If the instruction accepting unit 411 accepts an individual process instruction, the constructing unit 423 constructs an output image using one or more pieces of second processing information acquired by individual processing units (any one or more of 3221 to 322N) corresponding to the individual process instruction, and the first processing information.

The constructing unit 423 preferably constructs an output image using at least one piece of second processing information and the first processing information.

If the instruction accepting unit 411 accepts an individual process instruction, the output unit 43 outputs the output image constructed by the constructing unit 423. If the instruction accepting unit 411 does not accept an individual process instruction, the output unit 43 outputs the output image acquired using the first processing information. Note that "using the first processing information" means not using the second processing information. If the instruction accepting unit 411 does not accept an individual process instruction, the second processing information is not constructed.

The output unit 43 outputs the output image constructed by the constructing unit 423 in the case in which the instruction accepting unit 411 accepts an individual process instruction, and outputs the output image acquired using the first processing information in the case in which the instruction accepting unit 411 does not accept an individual process instruction. The output image acquired using the first processing information may be the first processing information.

If the constructing unit 423 constructs an output image using at least one piece of second processing information and the first processing information, the output unit 43 outputs the output image constructed by the constructing unit 423. In this case, the output image acquired using the first processing information and not using the second processing information is not output.

The processing unit 42, the generic processing unit 321, the individual processing unit 3221, the individual processing unit 3222, . . . , and the individual processing unit 322N, and the constructing unit 423 may be realized typically by MPUs, memories, or the like. Typically, the processing procedure of the processing unit 42 and the like is realized by software, and the software is stored in a storage medium such as a ROM. Note that the processing procedure may be realized also by hardware (dedicated circuits).

The output unit 43 may be considered to include or not to include an output device, such as a display screen. The output unit 43 may be realized, for example, by driver software for an output device, a combination of driver software for an output device and the output device, or the like.

Next, an operation of the video signal processing apparatus 4 will be described with reference to the flowchart in FIG. 26. In the flowchart in FIG. 26, a description of the same processes as those in the flowchart in the flowchart in FIG. 23 will be omitted.

(Step S2601) The processing unit 42 substitutes 1 for a counter i.

(Step S2602) The processing unit 42 determines whether or not an $i^{-th}$ individual process instruction is stored in the storage unit 30. If an $i^{-th}$ individual process instruction is stored, the procedure advances to step S2603, and, if not, the procedure advances to step S2605.

(Step S2603) The individual processing unit 322 corresponding to the $i^{-th}$ individual process instruction (the individual processing unit 322i) performs an individual process on the input image accepted in step S2301, thereby acquiring an $i^{-th}$ piece of second processing information.

(Step S2604) The processing unit 42 increments the counter i by 1. The procedure returns to step S2602.

(Step S2605) If one or more individual process instructions are stored in the storage unit 30, the constructing unit 423 constructs an output image using one or more pieces of second processing information acquired by the one or more individual processing units (any one or more of 3221 to 322N) respectively corresponding to the individual process instructions, and the first processing information acquired in step S2302. If an individual process instruction is not stored in the storage unit 30, the constructing unit 423 acquires an output image using the first processing information acquired in step S2302.

(Step S2606) The output unit 43 outputs the output image acquired in step S2605. The procedure returns to step S2301.

(Step S2607) The instruction accepting unit 411 determines whether or not an individual process instruction from a user has been accepted. If an individual process instruction has been accepted, the procedure advances to step S2608, and, if not, the procedure returns to step S2301. The individual process instruction is, for example, an identifier for identifying an individual process or an individual processing unit instructed by a user.

(Step S2608) The processing unit 42 accumulates the individual process instruction accepted in step S2607, in the storage unit 30. The procedure returns to step S2301.

Figure 26:
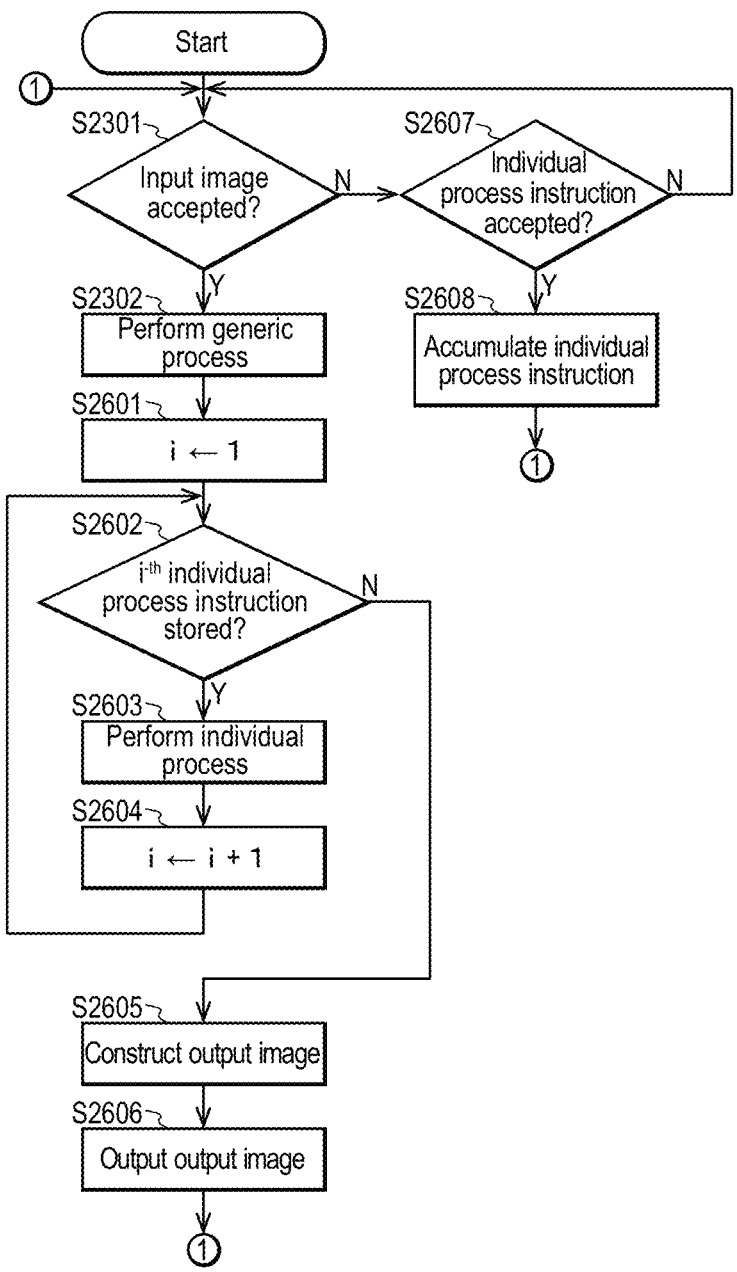
FIG. 26 is a flowchart illustrating an operation of the video signal processing apparatus 4 in the embodiment.

Note that the procedure is terminated by powering off or an interruption at the end of the process in the flowchart in FIG. 26.

Furthermore, in the flowchart in FIG. 26, it is preferable that an individual process instruction can be accepted in step S2607 even while an input image is being accepted in step S2301. That is to say, it is preferable that a user can change an individual process instruction while viewing an output image. It is preferable that accepting an input image in step S2301 and accepting an individual process instruction in step S2607 can be performed in parallel.

Figure 27:
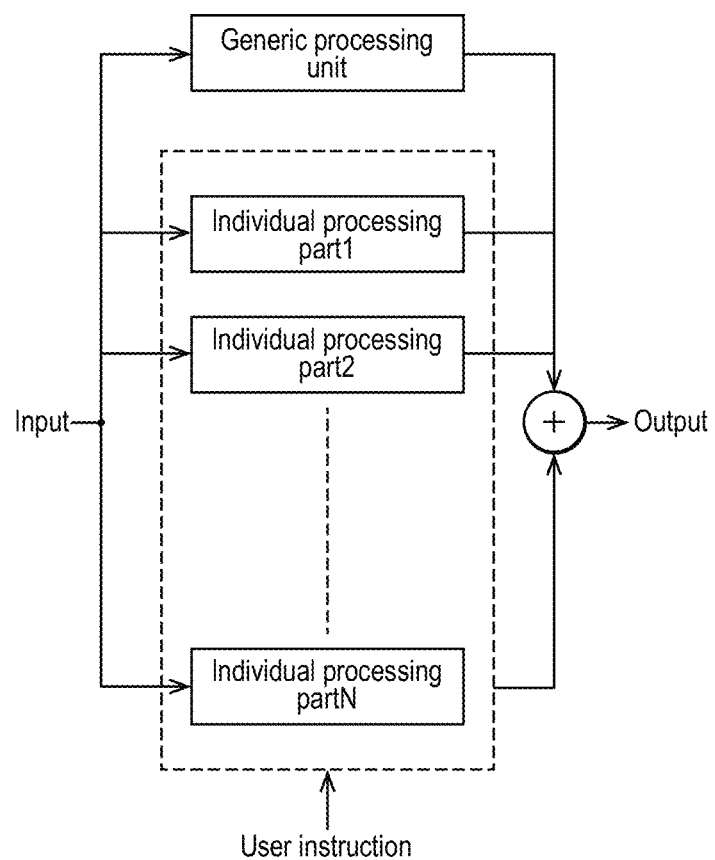
FIG. 27 is a diagram showing a concept of an operation of the video signal processing apparatus 4 in the embodiment.

Furthermore, FIG. 27 shows a processing concept of the flowchart in FIG. 26. FIG. 27 shows that the video signal processing apparatus 4 integrates input (an input image) with first processing information, which is a processing result of the generic processing unit 321, and one or at least two pieces of second processing information, which are processing results of one or more individual processing units 322, thereby obtaining an output image as output. The video signal processing apparatus 4 shows that whether or not each of the one or more individual processing units 322 operates is changed by a user instruction. The process that integrates first processing information and one or more pieces of second processing information is, for example, a process that acquires representative values (e.g., average values, or weighted average values, etc.) of one or more feature values of the first processing information that is an image and one or more feature values of each of the one or more pieces of second processing information that are images, and constructs an output image using the one or more representative values.

As described above, according to this embodiment, it is possible to customize an image process according to user's preference, and to output an image desired by a user.

The software that realizes the video signal processing apparatus in this embodiment is the following sort of program. Specifically, this program is a program for causing a computer to function as: an input image accepting unit that accepts an input image; an instruction accepting unit that accepts a user instruction as to whether or not to perform an individual process, which is an optional process; a generic processing unit that performs a generic process, which is an essential process, on the input image, thereby acquiring first processing information; an individual processing unit that, in a case in which the user instruction is an individual process instruction, which is an instruction to perform an individual process, performs an individual process on the input image, thereby acquiring second processing information; a constructing unit that, in a case in which the instruction accepting unit accepts an individual process instruction, constructs an output image using the first processing information and the second processing information; and an output unit that outputs the output image constructed by the constructing unit in a case in which the instruction accepting unit accepts an individual process instruction, and outputs the output image acquired using the first processing information in a case in which the instruction accepting unit does not accept an individual process instruction.

It is preferable that, according to the program, the program causes the computer to function such that the instruction accepting unit accepts a user instruction as to whether or not to perform an individual process corresponding to each of the two or more individual processing units, in a case in which the instruction accepting unit accepts an individual process instruction, the constructing unit constructs an output image using one or more pieces of second processing information acquired by individual processing units corresponding to the individual process instruction, and the first processing information, and the output unit outputs the output image constructed by the constructing unit in a case in which the instruction accepting unit accepts an individual process instruction, and outputs the output image acquired using the first processing information in a case in which the instruction accepting unit does not accept an individual process instruction.

It is preferable that, according to the program, the program causes the computer to function such that the instruction accepting unit accepts at least one individual process instruction, the constructing unit constructs an output image using at least one piece of second processing information and the first processing information, and the output unit outputs the output image constructed by the constructing unit.

Embodiment 5

This embodiment is different from Embodiment 3 in that there are two or more individual processing parts in an individual processing unit. The individual processing parts can be set by a user as to whether or not to operate. It will be appreciated that two or more processes may be performed in the individual processing parts.

In this embodiment, a video signal processing apparatus that performs a process using a generic processing unit, and a process using an individual processing unit in which any of the two or more individual processing parts functions, on an input image, thereby acquiring an output image, and outputs the image will be described.

Figure 28:
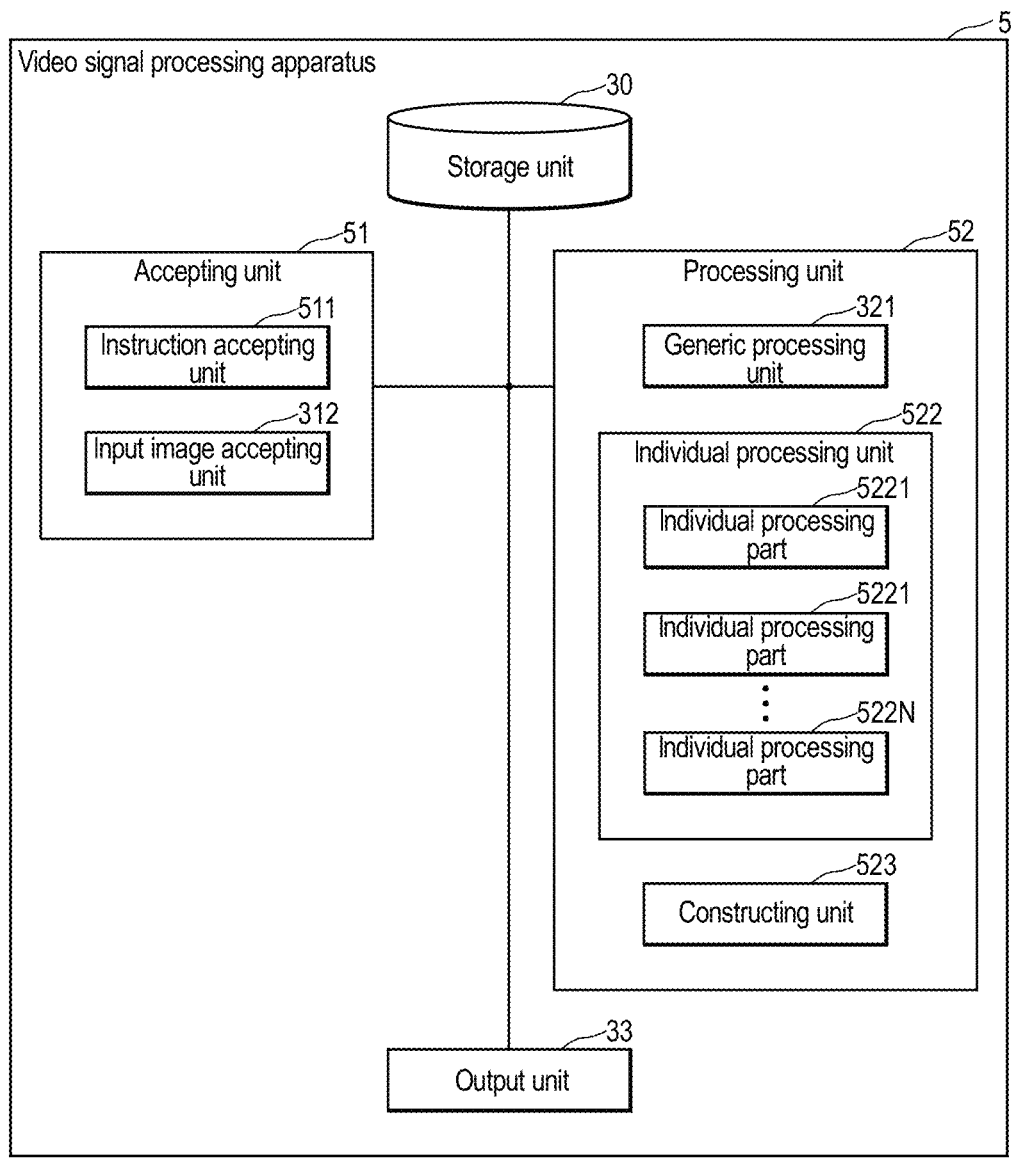
FIG. 28 is a block diagram of a video signal processing apparatus 5 in Embodiment 5.

FIG. 28 is block diagram of a video signal processing apparatus 5 in this embodiment.

The video signal processing apparatus 5 includes the storage unit 30, an accepting unit 51, a processing unit 52, and the output unit 33.

The accepting unit 51 includes an instruction accepting unit 511 and the input image accepting unit 312.

The processing unit 52 includes the generic processing unit 321, an individual processing unit 522, and a constructing unit 523.

The individual processing unit 522 includes an individual processing part 5221, an individual processing part 5222, . . . , and an individual processing part 522N.

The accepting unit 51 accepts various types of information. The various types of information are, for example, an input image or an user instruction.

The instruction accepting unit 511 accepts a user instruction as to whether or not to perform an individual process. The instruction accepting unit 511 accepts a user instruction as to whether or not to perform an individual process corresponding to each of the two or more individual processing parts. The instruction accepting unit 511 preferably accepts at least one individual process instruction. The one individual process instruction corresponds to one individual processing part.

The accepting is a concept that encompasses accepting information input from an input device such as a keyboard, a mouse, or a touch panel, receiving information transmitted via a wired or wireless communication line, accepting information read from a storage medium such as an optical disk, a magnetic disk, or a semiconductor memory, and the like.

The user instruction may be input through any part such as a keyboard, a mouse, a menu screen, or the like. The instruction accepting unit 511 may be realized by a device driver for an input part such as a keyboard, or control software for a menu screen, for example.

The processing unit 52 performs various processes. The various processes are, for example, processes that are performed by the generic processing unit 321, the individual processing unit 522, the constructing unit 523, and the like.

In a case in which the user instruction is an individual process instruction, which is an instruction to perform an individual process, the individual processing unit 522 performs an individual process on the input image, thereby acquiring second processing information. The individual processing unit 522 operates one or more individual processing parts corresponding to the individual process instruction, on the input image, thereby acquiring one piece of second processing information. The second processing information is typically an image.

The individual processing part 5221, the individual processing part 5222, . . . , and the individual processing part 522N each perform an individual process. The individual process that is performed by each of the individual processing part 5221, the individual processing part 5222, . . . , and the individual processing part 522N is, for example, the process described in Embodiment 3.

If the instruction accepting unit 511 accepts an individual process instruction, the constructing unit 523 constructs an output image using the first processing information and the second processing information.

If the instruction accepting unit 511 accepts an individual process instruction, the constructing unit 523 constructs an output image using the second processing information acquired using one or more individual processing parts 5221 corresponding to the individual process instruction, and the first processing information.

The output unit 33 outputs the output image constructed by the constructing unit 523 in the case in which the instruction accepting unit 511 accepts an individual process instruction, and outputs the output image acquired using the first processing information in the case in which the instruction accepting unit 511 does not accept an individual process instruction.

The processing unit 52, the generic processing unit 321, the individual processing unit 522, and the constructing unit 523 may be realized typically by MPUs, memories, or the like. Typically, the processing procedure of the processing unit 52 and the like is realized by software, and the software is stored in a storage medium such as a ROM. Note that the processing procedure may be realized also by hardware (dedicated circuits).

The output unit 33 may be considered to include or not to include an output device, such as a display screen or a speaker. The output unit 33 may be realized, for example, by driver software for an output device, a combination of driver software for an output device and the output device, or the like.

Next, an operation of the video signal processing apparatus 5 will be described with reference to the flowchart in FIG. 29. In the flowchart in FIG. 29, a description of the same processes as those in the flowchart in the flowchart in FIG. 23 or 26 will be omitted.

(Step S2901) The individual processing part (the individual processing part 522$i$) corresponding to an $i^{-th}$ individual process instruction performs an individual process on the input image accepted in step S2301 or an execution result of the individual processing part corresponding to the $(i-1)^{-th}$ individual process instruction. The execution result of the last individual processing part is second processing information.

(Step S2902) The instruction accepting unit 511 determines whether or not an individual process instruction from a user has been accepted. If an individual process instruction has been accepted, the procedure advances to step S2903, and, if not, the procedure returns to step S2301. The individual process instruction is, for example, an identifier for identifying an individual process or an individual processing part instructed by a user.

(Step S2903) The processing unit 52 accumulates the individual process instruction accepted in step S2607, in the storage unit 30. The procedure returns to step S2301.

Figure 29:
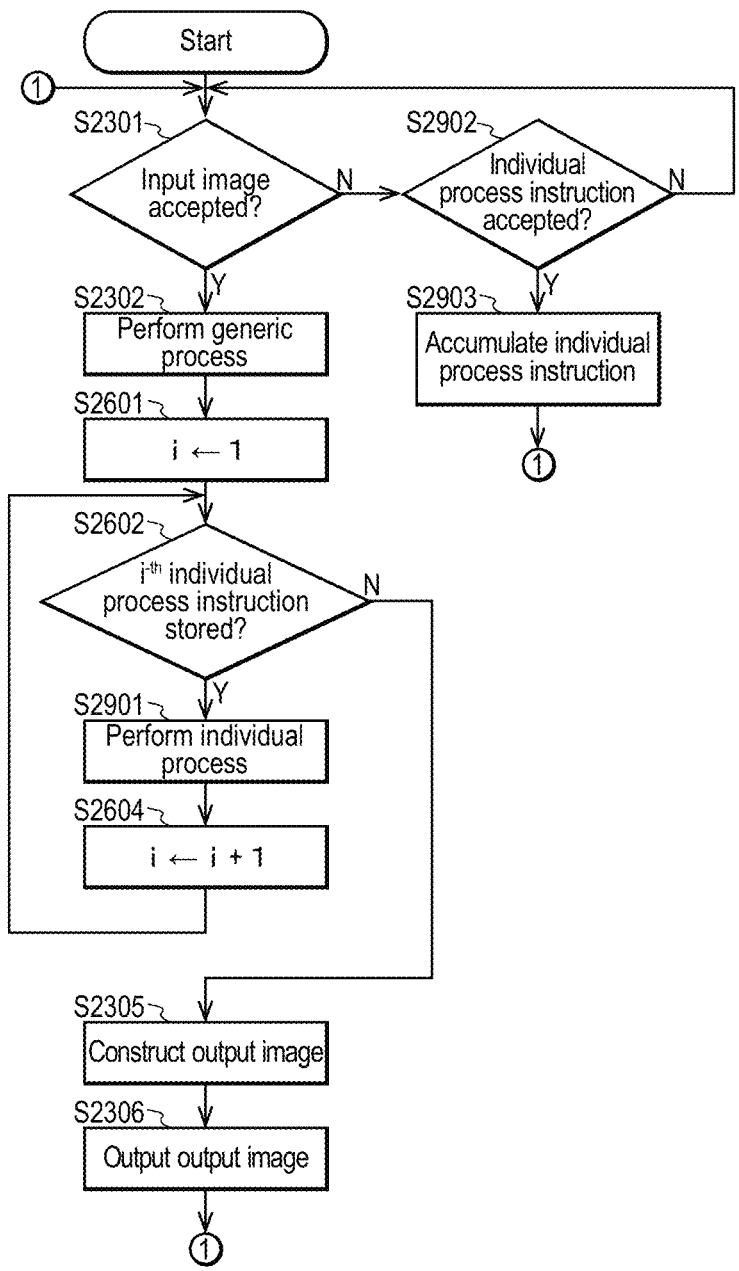
FIG. 29 is a flowchart illustrating an operation of the video signal processing apparatus 5 in the embodiment.

In the flowchart in FIG. 29, if N individual processing parts (N is a natural number of two or more) operate, an individual processing part that operates first performs a first individual process on the input image, thereby obtaining a first processing result. Then, an individual processing part that operates second performs a second individual process on the input image or the first processing result, thereby obtaining a second processing result. Then, an individual processing part that operates $N^{-th}$ (last) performs an $N^{-th}$ individual process on the input image or an $(N-1)^{-th}$ processing result, thereby obtaining an output image.

Note that the procedure is terminated by powering off or an interruption at the end of the process in the flowchart in FIG. 29.

Furthermore, in the flowchart in FIG. 29, it is preferable that an individual process instruction can be accepted in step S2902 even while an input image is being accepted in step S2301. That is to say, it is preferable that a user can change an individual process instruction while viewing an output image. It is preferable that accepting an input image in step S2301 and accepting an individual process instruction in step S2902 can be performed in parallel.

Figure 30:
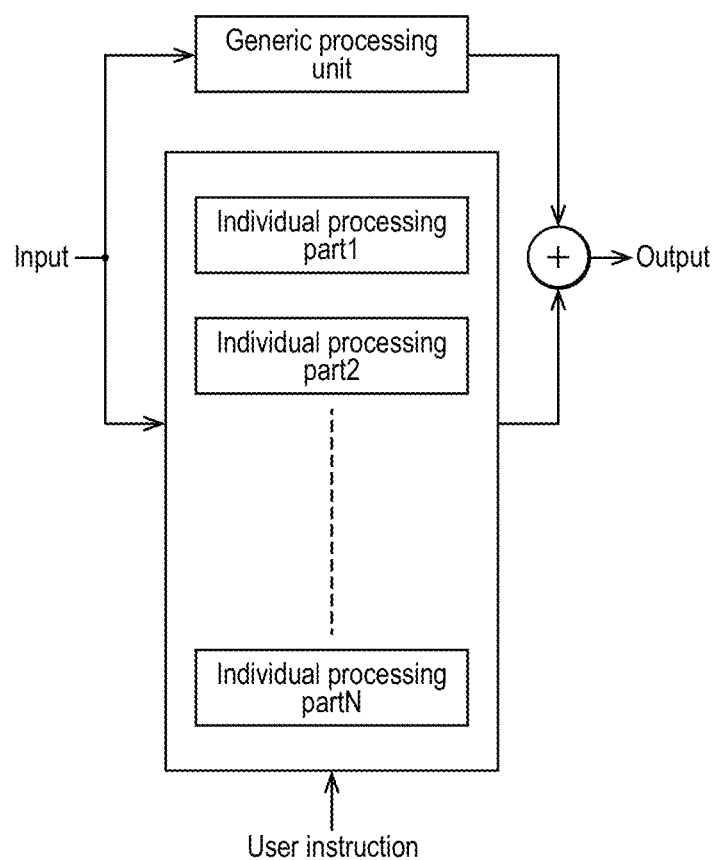
FIG. 30 is a diagram showing a concept of an operation of the video signal processing apparatus 5 in the embodiment.

Furthermore, FIG. 30 shows a processing concept of the flowchart in FIG. 29. FIG. 30 shows that the video signal processing apparatus 5 integrates input (an input image) with a processing result of the generic processing unit 321 and one processing result of the one or more individual processing parts, thereby obtaining an output image as output. The video signal processing apparatus 5 shows that whether or not each of the one or more individual processing parts operates is changed by a user instruction.

As described above, according to this embodiment, it is possible to customize an image process according to user's preference, and to output an image desired by a user.

The software that realizes the video signal processing apparatus in this embodiment is the following sort of program. Specifically, this program is a program for causing a computer to function, for example, as: an input image accepting unit that accepts an input image; an instruction accepting unit that accepts a user instruction as to whether or not to perform an individual process, which is an optional process; a generic processing unit that performs a generic process, which is an essential process, on the input image, thereby acquiring first processing information; an individual processing unit that, in a case in which the user instruction is an individual process instruction, which is an instruction to perform an individual process, performs an individual process on the input image, thereby acquiring second processing information; a constructing unit that, in a case in which the instruction accepting unit accepts an individual process instruction, constructs an output image using the first processing information and the second processing information; and an output unit that outputs the output image constructed by the constructing unit in a case in which the instruction accepting unit accepts an individual process instruction, and outputs the output image acquired using the first processing information in a case in which the instruction accepting unit does not accept an individual process instruction.

Figure 31:
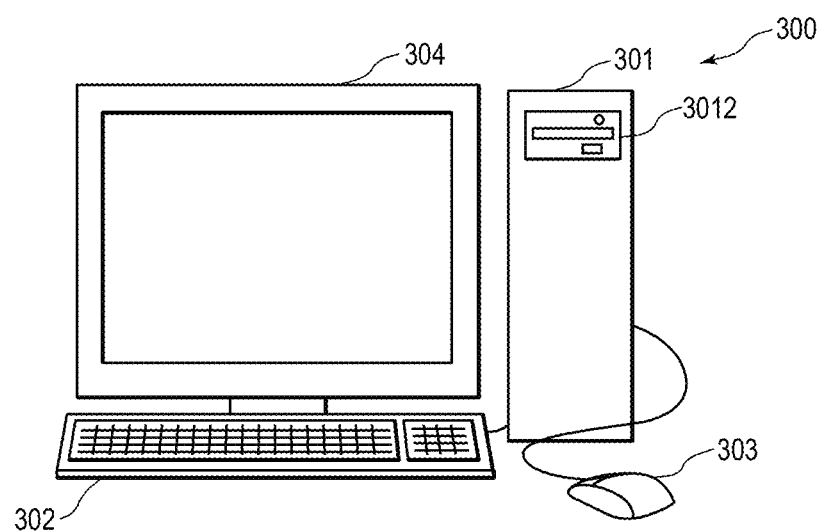
FIG. 31 is a schematic view of a computer system in the embodiments.
Figure 32:
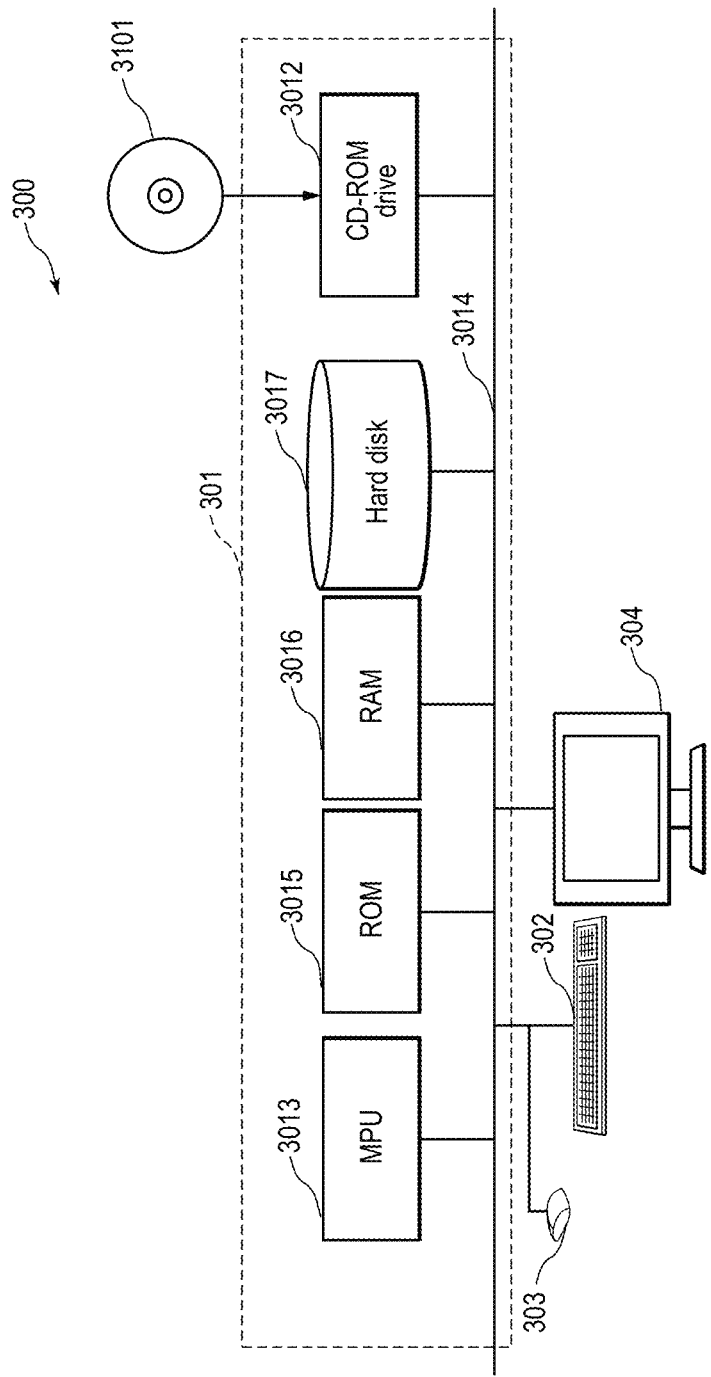
FIG. 32 is a block diagram of the computer system in the embodiments.

FIG. 31 shows the external appearance of a computer that executes the programs described in this specification to realize the image output apparatus or the video signal processing apparatus in the foregoing various embodiments. The foregoing embodiments may be realized using computer hardware and a computer program executed thereon. FIG. 31 is a schematic view of a computer system 300. FIG. 32 is a block diagram of the system 300.

In FIG. 31, the computer system 300 includes a computer 301 including a CD-ROM drive, a keyboard 302, a mouse 303, and a monitor 304.

In FIG. 32, the computer 301 includes not only the CD-ROM drive 3012, but also an MPU 3013, a bus 3014 connected to the CD-ROM drive 3012 and the like, a ROM 3015 in which a program such as a boot up program is to be stored, a RAM 3016 that is connected to the MPU 3013 and is a memory in which a command of an application program is temporarily stored and a temporary storage area is provided, and a hard disk 3017 in which an application program, a system program, and data are to be stored. Although not shown, the computer 301 may further include a network card that provides connection to a LAN.

The program for causing the computer system 300 to execute the functions of the image output apparatus and the like in the foregoing embodiments may be stored in a CD-ROM 3101 that is inserted into the CD-ROM drive 3012, and be transmitted to the hard disk 3017. Alternatively, the program may be transmitted via a network (not shown) to the computer 301 and stored in the hard disk 3017. At the time of execution, the program is loaded into the RAM 3016. The program may be loaded from the CD-ROM 3101, or directly from a network.

The program does not necessarily have to include, for example, an operating system (OS) or a third party program to cause the computer 301 to execute the functions of the image output apparatus and the like in the foregoing embodiments. The program may only include a command portion to call an appropriate function (module) in a controlled mode and obtain desired results. The manner in which the computer system 300 operates is well known, and thus a detailed description thereof has been omitted.

It should be noted that, in the program, in a step of transmitting information, a step of receiving information, or the like, processing that is performed by hardware, for example, processing performed by a modem or an interface card in the transmitting step (processing that can be performed only by hardware) is not included.

Furthermore, the computer that executes this program may be a single computer, or may be multiple computers. That is to say, centralized processing may be performed, or distributed processing may be performed.

Furthermore, in the foregoing embodiments, it will be appreciated that two or more communication parts in one apparatus may be physically realized by one medium.

In the foregoing embodiments, each process may be realized as centralized processing using a single apparatus, or may be realized as distributed processing using multiple apparatuses.

The present invention is not limited to the embodiment set forth herein. Various modifications are possible within the scope of the present invention.

As described above, the image output apparatus according to the present invention has an effect that it is possible to simultaneously output two or more images obtained by performing different processes on one input image, and thus this apparatus is useful as a television receiver and the like.

What is claimed is:

1. An image output apparatus comprising:
  a processor;
  a first non-transitory memory; and
  a non-transitory program memory storing a program, the program, when executed by the processor, causing the processor to function as:
    an input image accepting unit that accepts an input image;
    a first image acquiring unit that acquires a first image by performing a first process on the input image;
    a second image acquiring unit that acquires a second image by performing a second process that is a different type process from the first process on the first image;
    an instruction accepting unit that accepts, before accepting the input image, an individual process instruction to perform an individual process;
    a storing unit that stores the individual process instruction into the first non-transitory memory; and
    an output unit that outputs and simultaneously displays the first image and the second image, wherein:
  the first image acquiring unit acquires the first image by performing a first generic image process on the input image,
  the second image acquiring unit acquires the second image by performing a second individual image process on the first image according to the individual process instruction stored in the first non-transitory memory,
  the first generic image process is performed regardless of the individual process instruction, and
  the second image acquiring unit acquires one or more feature values of an image of a region containing a partial spatial region of the input image, the first image, or the second image, and performs different type processes according to the one or more feature values.

2. The image output apparatus according to claim 1, wherein the program, when executed by the processor, causes the processor to further function as: two or more second image acquiring units, each being the second image acquiring unit, that respectively perform different type image processes on the first image,
  wherein the output unit outputs two or more second images respectively acquired by the two or more second image acquiring units, and the first image.

3. The image output apparatus according claim 1, further comprising a second non-transitory memory in which correspondence information indicating correspondence between optical signal information related to an optical signal in an environment in which an image is acquired and electrical signal information related to an electrical signal in the environment is stored,
  wherein the first image acquiring unit or the second image acquiring unit acquires one or more pieces of optical signal information corresponding to one or more pieces of electrical signal information that are acquired from the input image, using the correspondence information in the second storage, and acquires the first image or the second image from the input image using the optical signal information.

4. The image output apparatus according to claim 1, wherein the program, when executed by the processor, causes the processor to further function as: a system feature accepting unit that accepts one or more system features from when an image is acquired to when an image is output,
  wherein the first image acquiring unit or the second image acquiring unit acquires the first image or the second image using the one or more system features.

5. The image output apparatus according to claim 1, wherein the output unit outputs the first image and the second image to a same display screen.

6. The image output apparatus according to claim 5, wherein the output unit outputs the first image and the second image to a same display screen in a picture-in-picture manner.

7. The image output apparatus according to claim 1, wherein the second image is an image of the partial spatial region of the first image.

8. The image output apparatus according to claim 1, wherein, in a case in which a user instruction that specifies the partial spatial region of the first image is accepted, the second image acquiring unit acquires the second image by performing the second individual image process that is a different type process from the process that is performed by the first image acquiring unit, on an image of the spatial region specified by the user instruction.

9. The image output apparatus according to claim 1,
wherein the second image includes images of two or more spatial regions, each of which is part of the first image,
the second image acquiring unit acquires two or more second images of the two or more spatial regions, and
the output unit outputs the first image and the two or more second images.

10. The image output apparatus according to claim 1, further comprising:
an non-transitory image memory in which an image is stored, wherein:
the program, when executed by the processor, causes the processor to further function as a storing processing unit that stores at least one of a whole or part of the input image, the first image, or the second image, in the non-transitory image memory,
the second image acquiring unit acquires the second image by performing the second individual image process that is a different type process from the process that is performed by the first image acquiring unit, on the image stored in the non-transitory image memory, and
the output unit simultaneously outputs and displays the first image, and the second image acquired based on another input image corresponding to a time different from the input image from which the first image is acquired.

11. The image output apparatus according to claim 1, wherein a position or a size of a display region of the second image is allowed to dynamically change.

12. The image output apparatus according to claim 1, wherein the second image acquiring unit extracts an image of the partial spatial region from the first image, thereby acquiring the second image.

13. The image output apparatus according to claim 1, further comprising:
a non-transitory parameter memory in which one or more parameters that are used for the first process that is performed by the first image acquiring unit or the second process that is performed by the second image acquiring unit are stored, wherein:
the program, when executed by the processor, causes the processor to further function as a parameter storing unit that, in a case in which one or more parameters are accepted, stores the one or more parameters in the non-transitory parameter memory, and
the first image acquiring unit or the second image acquiring unit acquires the first image or the second image, using the one or more parameters in the non-transitory parameter memory.

14. The image output apparatus according to claim 1, wherein:
the first generic image process comprises one or more processes selected from the group consisting of:
a conversion process of a number of pixels of the input image,
a distortion removing process on the input image,
a natural rule obeying process that converts image signals of the input image in consideration of behavior of light in nature,
an image quality improving process on the input image,
a resolution increasing process on the input image,
a noise removing process on the input image,
a process that, after the input image is subjected to an image conversion process determines whether or not an image obtained through the image conversion process has a signal that is out of an acceptable range as an electrical signal, and, if there is a signal that is out of the acceptable range, performs quantization again such that the signal is not truncated,
an image conversion process that convert the input image using an operation expression,
a process that selects a look-up-table (LUT) corresponding to one or more system features accepted from two or more LUTs, and performs an image conversion process using the selected LUT, and
a process that acquires change information corresponding to the one or more system features accepted, changes an image conversion operation expression using the change information, and performs an image conversion process using the changed image conversion operation expression, and
the second individual image process comprises one or more processes selected from the group consisting of:
a process that brightens an image,
a process that removes camera noise,
a process that removes coding distortion,
a process that changes an image so as to increase or decrease a shading level of the image,
a process that changes an orientation or a length of a shadow in an image,
a process that virtually changes a position of a light source,
a process that detects an orientation of a subject in an image, and adjusts the intensity of light reflection according to the orientation,
a natural rule obeying process that converts image signals in consideration of behavior of light in nature,
a conversion process of a number of pixels of the input image,
a distortion removing process on the input image,
a natural rule obeying process that converts image signals of the input image in consideration of behavior of light in nature,
an image quality improving process on the input image,
a resolution increasing process on the input image,
a noise removing process on the input image,
a process that, after the input image is subjected to an image conversion process determines whether or not an image obtained through the image conversion process has a signal that is out of an acceptable range as an electrical signal, and, if there is a signal that is out of the acceptable range, performs quantization again such that the signal is not truncated,
an image conversion process that convert the input image using an operation expression,
a process that selects a look-up-table (LUT) corresponding to one or more system features accepted from two or more LUTs, and performs an image conversion process using the selected LUT, and
a process that acquires change information corresponding to the one or more system features accepted, changes an image conversion operation expression using the change information, and performs an image conversion process using the changed image conversion operation expression.

15. An image output apparatus comprising:
a processor;
a first non-transitory memory; and
a non-transitory program memory storing a program, the program, when executed by the processor, causing the processor to function as:

an input image accepting unit that accepts an input image;

a first image acquiring unit that acquires a first image by performing a first process on the input image;

a second image acquiring unit that acquires a second image by performing a second process that is a different type process from the first process on the first image;

an instruction accepting unit that accepts, before accepting the input image, an individual process instruction to perform an individual process;

a storing unit that stores the individual process instruction into the first non-transitory memory; and an output unit that outputs and simultaneously displays the first image and the second image, wherein:

the first image acquiring unit acquires the first image by performing a first generic image process on the input image, and further performing a first individual image process on a result of the first generic image process according to the individual process instruction stored in the first non-transitory memory, the second image acquiring unit acquires the second image by performing a second generic image process on the input image, and further performing a second individual image process on a result of the second generic image process according to the individual process instruction stored in the first non-transitory memory, the first and second generic image processes are performed regardless of the individual process instruction, and the second image acquiring unit acquires one or more feature values of an image of a region containing a partial spatial region of the input image, the first image, or the second image, and performs different type processes according to the one or more feature values.

16. The image output apparatus according to claim 15, wherein:

each of the first generic image process and the second generic image process comprises one or more processes selected from the group consisting of:

a conversion process of a number of pixels of the input image, a distortion removing process on the input image, a natural rule obeying process that converts image signals of the input image in consideration of behavior of light in nature, an image quality improving process on the input image, a resolution increasing process on the input image, a noise removing process on the input image, a process that, after the input image is subjected to an image conversion process determines whether or not an image obtained through the image conversion process has a signal that is out of an acceptable range as an electrical signal, and, if there is a signal that is out of the allowable range, performs quantization again such that the signal is not truncated, an image conversion process that convert the input image using an operation expression, a process that selects a look-up-table (LUT) corresponding to one or more system features accepted from two or more LUTs, and performs an image conversion process using the selected LUT, and a process that acquires change information corresponding to the one or more system features accepted, changes an image conversion operation expression using the change information, and performs an image conversion process using the changed image conversion operation expression, and each of the first individual image process and the second individual image process comprises one or more processes selected from the group consisting of:

a process that brightens an image, a process that removes camera noise, a process that removes coding distortion, a process that changes an image so as to increase or decrease a shading level of the image, a process that changes an orientation or a length of a shadow in an image, a process that virtually changes a position of a light source, a process that detects an orientation of a subject in an image, and adjusts the intensity of light reflection according to the orientation, a natural rule obeying process that converts image signals in consideration of behavior of light in nature, a conversion process of a number of pixels of the input image, a distortion removing process on the input image, a natural rule obeying process that converts image signals of the input image in consideration of behavior of light in nature, an image quality improving process on the input image, a resolution increasing process on the input image, a noise removing process on the input image, a process that, after the input image is subjected to an image conversion process determines whether or not an image obtained through the image conversion process has a signal that is out of an acceptable range as an electrical signal, and, if there is a signal that is out of the allowable range, performs quantization again such that the signal is not truncated, an image conversion process that convert the input image using an operation expression, a process that selects a look-up-table (LUT) corresponding to one or more system features accepted from two or more LUTs, and performs an image conversion process using the selected LUT, and a process that acquires change information corresponding to the one or more system features accepted, changes an image conversion operation expression using the change information, and performs an image conversion process using the changed image conversion operation expression.

17. An image output method realized by a processor which functions by an executed program as an instruction accepting unit, an input image accepting unit, a first image acquiring unit, a second image acquiring unit, and an output unit, comprising:

an instruction accepting step of the instruction accepting unit accepting an individual process instruction to perform an individual process;

an input image accepting step of the input image accepting unit accepting an input image;

a first image acquiring step of the first image acquiring unit acquiring a first image by performing a first process on the input image;

a second image acquiring step of the second image acquiring unit acquiring a second image by performing a second process that is a different type process from the first process on the first image according to an individual process instruction; and an output step of the output unit outputting and simultaneously displaying the first image and the second image, wherein the first process is performed regardless of the individual process instruction and the second image acquiring step comprises the second image acquiring unit acquiring one or more feature values of an image of a region containing a partial spatial region of the input image, the first image, or the second image, and performing different type processes according to the one or more feature values.

18. A non-transitory computer readable storage medium storing a program for causing a computer to perform the method according to claim 17.

19. An image output method realized by a processor which functions by an executed program as, an instruction accepting unit, an input image accepting unit, a first image acquiring unit, a second image acquiring unit, and an output unit, comprising:

an instruction accepting step of the instruction accepting unit accepting an individual process instruction to perform an individual process;

an input image accepting step of the input image accepting unit accepting an input image;

a first image acquiring step of the first image acquiring unit acquiring a first image by performing a first generic image process on the input image, and further performing a first individual image process on a result of the first generic image process according to the individual process instruction stored in a first non-transitory memory;

a second image acquiring step of the second image acquiring unit acquiring a second image by performing a second generic image process on the input image, and further performing a second individual image process on a result of the second generic image process according to the individual process instruction stored in the first non-transitory memory; and an output step of the output unit outputting and simultaneously displaying the first image and the second image, wherein the first and second generic image processes are performed regardless of the individual process instruction, and the second image acquiring step comprises the second image acquiring unit acquiring one or more feature values of an image of a region containing a partial spatial region of the input image, the first image, or the second image, and performing different type processes according to the one or more feature values.

* * * * *